(12) United States Patent
Berg et al.

(10) Patent No.: US 9,405,529 B2
(45) Date of Patent: *Aug. 2, 2016

(54) DESIGNING AND CROSS-CONFIGURING SOFTWARE

(71) Applicant: International Business Machines Corporation, Armonk, NY (US)

(72) Inventors: Daniel C. Berg, Holly Springs, NC (US); Tamar Eilam, New York, NY (US); Michael H. Kalantar, Chapel Hill, NC (US); Alexander Kofman, Haifa (IL); Fabio A. Oliveira, White Plains, NY (US); Florian Rosenberg, Perg (AT); Gilad M. Saadoun, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,760

(22) Filed: Oct. 30, 2015

(65) Prior Publication Data
US 2016/0054992 A1 Feb. 25, 2016

Related U.S. Application Data

(63) Continuation of application No. 13/800,827, filed on Mar. 13, 2013, now Pat. No. 9,223,568, which is a continuation of application No. 13/491,241, filed on Jun. 7, 2012, now Pat. No. 8,793,652.

(51) Int. Cl.
*G06F 9/44* (2006.01)
*G06F 9/445* (2006.01)

(52) U.S. Cl.
CPC .. *G06F 8/65* (2013.01); *G06F 8/61* (2013.01); *G06F 8/71* (2013.01); *G06F 9/44505* (2013.01)

(58) Field of Classification Search
None
See application file for complete search history.

(56) References Cited

U.S. PATENT DOCUMENTS 5,950,011 A 9/1999 Albrecht et al.
5,970,490 A 10/1999 Morgenstern
(Continued)

FOREIGN PATENT DOCUMENTS

WO 2012000809 1/2012
WO 2012006638 1/2012

OTHER PUBLICATIONS

Cascla et al., "Identity Federation in Cloud Computing?" 2010 Sixth International Conference on Information Assurance and Security.
(Continued)

*Primary Examiner* — Insun Kang
(74) *Attorney, Agent, or Firm* — Fleit Gibbons Gutman Bongini Bianco PL; Thomas S. Grzesik

(57) ABSTRACT

Various embodiments create a cross-configuration software module for cross-configuring software entities. In one embodiment, a first set of requirements and at least a second set of requirements are obtained. Each of the first and second set of requirements identify at least one of a set of software entities and a set of hardware components required to be present on at least one system including software entities to be cross-configured. At least one set of operations is obtained. The set of operations includes at least one executable instruction that configures a first software entity with a second software entity. A first configuration definition is generated including at least the first set of requirements and the at least one set of operations. A second configuration definition is generated including at least the second set of requirements. The first and second configuration definitions are stored within a cross-configuration software module.

13 Claims, 17 Drawing Sheets

(56) References Cited

U.S. PATENT DOCUMENTS

| | | | |
|---|---|---|---|
| 6,256,773 B1 | 7/2001 | Bowman-Amuah | |
| 6,629,065 B1 | 9/2003 | Gadh et al. | |
| 6,640,238 B1 | 10/2003 | Bowman-Amuah | |
| 6,701,514 B1 | 3/2004 | Haswell et al. | |
| 6,789,054 B1 | 9/2004 | Makhlouf | |
| 6,795,089 B2 | 9/2004 | Rajarajan et al. | |
| 6,985,901 B1 | 1/2006 | Sachse et al. | |
| 7,050,872 B2 | 5/2006 | Matheson | |
| 7,069,541 B2 | 6/2006 | Dougherty et al. | |
| 7,069,553 B2 | 6/2006 | Narayanaswamy et al. | |
| 7,103,874 B2 | 9/2006 | McCollum et al. | |
| 7,134,122 B1 | 11/2006 | Sero et al. | |
| 7,152,229 B2 | 12/2006 | Chong et al. | |
| 7,196,712 B2 | 3/2007 | Rajarajan et al. | |
| 7,245,761 B2 | 7/2007 | Swaminathan et al. | |
| 7,320,120 B2 | 1/2008 | Rajarajan et al. | |
| 7,370,315 B1 | 5/2008 | Lovell et al. | |
| 7,463,263 B2 | 12/2008 | Gilboa | |
| 7,568,019 B1 | 7/2009 | Bhargava et al. | |
| 7,630,877 B2 | 12/2009 | Brown et al. | |
| 7,643,597 B2 | 1/2010 | Liu et al. | |
| 7,665,085 B2 | 2/2010 | Sundararajan et al. | |
| 7,669,137 B2 | 2/2010 | Chafe et al. | |
| 7,712,086 B2 | 5/2010 | Hughes et al. | |
| 7,735,062 B2 | 6/2010 | de Seabra e Melo et al. | |
| 7,779,383 B2 | 8/2010 | Bornhoevd et al. | |
| 7,849,460 B1 | 12/2010 | Martin et al. | 717/174 |
| 7,900,201 B1 | 3/2011 | Qureshi et al. | |
| 7,962,891 B2 | 6/2011 | Kimelman et al. | |
| 8,095,631 B2 | 1/2012 | Manico et al. | |
| 8,209,687 B2 | 6/2012 | Yuyitung et al. | |
| 8,281,307 B2 | 10/2012 | Arnold et al. | |
| 2002/0016809 A1* | 2/2002 | Foulger | G06F 9/4881 718/102 |
| 2003/0037327 A1 | 2/2003 | Cicciarelli et al. | |
| 2003/0084156 A1 | 5/2003 | Graupner et al. | |
| 2003/0163450 A1 | 8/2003 | Borenstein et al. | |
| 2004/0179011 A1 | 9/2004 | Marshall | |
| 2005/0055692 A1 | 3/2005 | Lupini et al. | |
| 2005/0120335 A1 | 6/2005 | Kelley et al. | 717/121 |
| 2005/0198244 A1 | 9/2005 | Eilam et al. | |
| 2005/0289538 A1 | 12/2005 | Black-Ziegelbein et al. | |
| 2006/0053410 A1 | 3/2006 | Charisius et al. | |
| 2006/0066627 A1 | 3/2006 | Gerhard et al. | |
| 2006/0101091 A1 | 5/2006 | Carbajales et al. | |
| 2006/0101445 A1 | 5/2006 | Carbajales et al. | |
| 2006/0230314 A1 | 10/2006 | Sanjar et al. | |
| 2006/0235733 A1 | 10/2006 | Marks | |
| 2006/0271909 A1 | 11/2006 | Huang et al. | |
| 2007/0050764 A1 | 3/2007 | Traut | |
| 2007/0055972 A1 | 3/2007 | Brown et al. | |
| 2007/0074203 A1 | 3/2007 | Curtis et al. | |
| 2007/0078988 A1 | 4/2007 | Miloushev et al. | |
| 2007/0168925 A1 | 7/2007 | Bornhoevd et al. | |
| 2007/0179823 A1 | 8/2007 | Bhaskaran et al. | |
| 2007/0277151 A1 | 11/2007 | Brunel et al. | |
| 2007/0288885 A1 | 12/2007 | Brunel et al. | |
| 2008/0028365 A1 | 1/2008 | Eri | |
| 2008/0082959 A1 | 4/2008 | Fowler | |
| 2008/0120350 A1 | 5/2008 | Grabowski et al. | |
| 2008/0127049 A1 | 5/2008 | Elaasar | |
| 2008/0183725 A1 | 7/2008 | Blakeley et al. | |
| 2008/0235506 A1 | 9/2008 | Eilam et al. | |
| 2008/0244595 A1 | 10/2008 | Eilam et al. | 718/104 |
| 2008/0250405 A1 | 10/2008 | Farhangi et al. | 717/177 |
| 2008/0307414 A1 | 12/2008 | Alpern et al. | |
| 2008/0313008 A1 | 12/2008 | Lee et al. | |
| 2008/0313595 A1 | 12/2008 | Boulineau et al. | |
| 2008/0313596 A1 | 12/2008 | Kreamer et al. | |
| 2009/0006069 A1 | 1/2009 | Alam et al. | |
| 2009/0007062 A1 | 1/2009 | Gilboa | |
| 2009/0012842 A1 | 1/2009 | Srinivasan et al. | |
| 2009/0044170 A1 | 2/2009 | Bernardi et al. | |
| 2009/0077621 A1 | 3/2009 | Lang et al. | |
| 2009/0089776 A1* | 4/2009 | Sonkin | G06F 8/60 717/174 |
| 2009/0132562 A1 | 5/2009 | Mehr et al. | |
| 2009/0133014 A1 | 5/2009 | Laurila et al. | 717/174 |
| 2009/0171993 A1 | 7/2009 | Arthursson | |
| 2009/0249279 A1 | 10/2009 | Bourdon | |
| 2009/0249281 A1 | 10/2009 | Fritzsche et al. | |
| 2009/0278847 A1 | 11/2009 | Berg et al. | |
| 2009/0300151 A1* | 12/2009 | Friedman | G06F 11/3664 709/222 |
| 2009/0319239 A1 | 12/2009 | Arnold et al. | |
| 2009/0319467 A1 | 12/2009 | Berg et al. | |
| 2010/0017797 A1 | 1/2010 | Hwang | |
| 2010/0030893 A1 | 2/2010 | Berg et al. | |
| 2010/0031247 A1 | 2/2010 | Arnold et al. | |
| 2010/0031257 A1 | 2/2010 | Ikegaya et al. | |
| 2010/0054527 A1 | 3/2010 | Kirmse et al. | |
| 2010/0058331 A1 | 3/2010 | Berg et al. | |
| 2010/0070449 A1 | 3/2010 | Arnold et al. | |
| 2010/0077328 A1 | 3/2010 | Berg et al. | |
| 2010/0083212 A1 | 4/2010 | Fritzsche et al. | |
| 2010/0138795 A1 | 6/2010 | Berg et al. | |
| 2010/0186009 A1 | 7/2010 | Sen et al. | |
| 2010/0287280 A1 | 11/2010 | Sivan | |
| 2010/0306772 A1 | 12/2010 | Arnold et al. | 718/1 |
| 2011/0016074 A1 | 1/2011 | Berg et al. | |
| 2011/0029967 A1 | 2/2011 | Berg et al. | |
| 2011/0107299 A1* | 5/2011 | Dehaan | G06F 9/45533 717/121 |
| 2011/0246976 A1* | 10/2011 | Kibbar | G06F 9/44505 717/170 |
| 2011/0283138 A1 | 11/2011 | Sangubhatla et al. | 714/15 |
| 2012/0005691 A1 | 1/2012 | Wong et al. | |
| 2012/0011028 A1 | 1/2012 | Thomas | |
| 2012/0011432 A1 | 1/2012 | Strutton | |
| 2012/0081395 A1 | 4/2012 | Adi et al. | |
| 2012/0084769 A1* | 4/2012 | Adi | G06F 8/63 717/174 |
| 2013/0042219 A1* | 2/2013 | Said | G06F 8/436 717/103 |
| 2013/0332900 A1 | 12/2013 | Berg et al. | |
| 2013/0332901 A1 | 12/2013 | Berg et al. | |

OTHER PUBLICATIONS

Yang et al., "A Profile-based Approach to Just-in-Time Scalability for Cloud Applications," IEEE International Conference on Cloud Computing, 2009.

Prahalad et al., "Phoenix: System for Implementing Private and Hybrid Cloud for OMIC Sciences Applications," Seventh International Conference on Wireless and Optical Communications Networks (WOCN), 2010.

Foster "Globus-Toolkit," The Grid: Blueprint for a new Computing Infrastructure, 1st ed: Morgan Kaufmann Publishers, 1998.

Afghan et al., "GridAtlas—A Grid Application and Resource Configuration Repository and Discovery Service," IEEE International Conference on Cluster Computing and Workshops, 2009.

Non Final Office Action dated Oct. 11, 2013, for U.S. Appl. No. 13/491,241.

Non Final Office Action dated Nov. 10, 2011, received for U.S. Appl. No. 12/476,006.

Non Final Office Action dated Apr. 2, 2013, received for U.S. Appl. No. 13/570,711.

Final Office Action dated Nov. 20, 2013, received for U.S. Appl. No. 12/895,461.

Final Office Action dated Dec. 31, 2014, received for U.S. Appl. No. 12/895,461.

Non Final Office Action dated May 7, 2014, received for U.S. Appl. No. 12/895,461.

Non Final Office Action dated May 13, 2013, received for U.S. Appl. No. 12/895,461.

Non Final Office Action dated Oct. 3, 2012, received for U.S. Appl. No. 12/895,461.

Final Office Action dated Oct. 2, 2013, received for U.S. Appl. No. 13/036,588.

(56) References Cited

OTHER PUBLICATIONS

Non Final Office Action dated Jan. 23, 2013, received for U.S. Appl. No. 13/036,588.
Smith, B., et al., "IBM e-business technology, solution, and design overview," Aug. 2004, pp. 1-380. Student Edition.
Reimer, D., et al., "Opening Black Boxes: Using Semantic Information to Combat Virtual Machine Image Sprawl," ACM978-1-59593-796—Apr. 8, 2003; Mar. 5-7, 2008, pp. 1-10, Seattle, Washington, Copyright 2008.
Lutterkort, D., et al., "Manageable Virtual Appliances," Linux Symposium, Jun. 2007, pp. 1-12, vol. 1.
Krsul, I., et al., "VMPlants: Providing and Managing Virtual Machine Execution Environments for Grid Computing," Proceedings of the ACM/IEEE SC2004 Conference on Supercomputing, Nov. 2004, pp. 1-12.
Hnetynka, P., "A Model-driven Environment for Component Deployment," Proceedings of the Third ACIS Int'l Conference on Engineering Research, Management and Application, Aug. 11-13, 2005, pp. 1-8.
Hall, R., et al., "Evaluating Software Deployment Languages and Schema—An Experience Report," Knowledge Gate from IBM Market Insights, Nov. 16-20, 1998, pp. 1-9.
Dearle, A., "Software Deployment, Past, Present and Future," Future of Software Engineering, May 23-25, 2007, pp. 1-16.
Hall, R., et al, "A Cooperative Approach to Support Software Deployment Using the Software Dock," Proceedings of the International Conference on Software Engineering, May 22, 1999, pp. 1-10.
Balasubramania, K., et al., "Model Driven Middleware: A New Paradigm for Developing and Provisionaling Distributed Real-time and Embedded Applications," Nov. 14, 2003, pp. 1-28.
Kecskemeti, G., et al., "Automatic Service Deployment Using Virtualisation," 16th Euromicro Conference on Parallel, Distributed and Network-Based Processing, Feb. 13-15, 2008. pp. 1-8.
Sinnema, M., et al., "COVAMOF: A Framework for Modeling Variability in Software Product Families," Aug. 2004, pp. 1-18, University of Groningen, The Netherlands.
Pons, A.P. "Semantic Prefetching Objects of Slower Web Site Pages," Dec. 2006, pp. 1715-1724; Science Direct.
Green, A.R., et al., "Modular, Best-Practice Solutions for a Semantic Web-Based Digital Library Application", May 2008, pp. 1-10, National Council for Science and Technology, Mexico and National Autonomous University of Mexico.
Arnold, W., et al., "Pattern Based SOA Deployment," Sep. 2007, pp. 1-12, Service-Oriented Computing.
Eilam, T., et al., "Pattern-Based Composite Application Deployment," 12th IFIP/IEEE International Symposium on Integrated Network Management, May 2011, pp. 1-8.
VMware, "WMware Infrastructure Management Assistant (VIMA) 1.0 Release Notes," Oct. 27, 2008, pp. 1-3.
VMware, "Virtual Disk API Programming Guide," Apr. 11, 2008, pp. 1-44.
Messmer, B., "Efficient Graph Matching Algorithms", PhD Thesis from the University of Bern, Nov. 24, 1995, pp. 1-161.
Eilam, T., et al., "Reducing the Complexity of Application Deployment in Large Data Centers," Topology Management, May 2005, pp. 1-14.
Peiris, M., et al., "Pro WCF Practical Microsoft SOA Implementation: APRESS," Jan. 10, 2007, pp. 1-512.
Arnold, W., et al., "Pattern based SOA Deployment," Sep. 17-20, 2007, pp. 1-12. vol. 4749.
Kodali, R., "What is service-oriented Architecture," Javaworld, Jun. 13, 2005, pp. 1-4.
Parikh, A., et al., "SOA for the real world," Javaworld, Nov. 29, 2006, pp. 1-3.
Erl, T., "Introducing SOA Design Patterns," Aug. 16, 2008, pp. 1-5.
Corneil D., et a., "An Efficient Algorithm for Graph Isomorphism," Journal of the Association for Computing Machinery, Jan. 1970, pp. 1-14, vol. 17, No. 1.
Ullmann, J., "An Algorithm for Subgraph Isomorphism," Journal of the Association for Computing Machinery, Jan. 1976, pp. 1-12, vol. 23, No. 1.
Tsai, W., et al., "Error-Correcting Isomorphisms of Attributed Relational Graphs for Pattern Analysis," IEEE Transactions on Systems, Man, and Cybernetics, Dec. 1979, pp. 1-12, vol. 9, No. 12.
Pralahad H.A., Asoke Talukder, Shubhani Pardeshi, Sameer Tamsekar, Hari Krishna R., Chandrashekar M.A., B. Niket, Santhosh Gandham, (Phoenix: System for Implementing Private and Hybrid Cloud for OMIC Science Applications), 2010, IEEE, (Whole Document).

* cited by examiner

New Connector

Please describe the new connector

| | |
|---|---|
| Name: | Petclinic-MySQL-Connector (804) |
| Universal ID: | icon.connector.petclinic-mysql (806) |
| Version: | 1.0.0 (808) |
| End Point A name: | Petclinic (810) |
| End Point B name: | MySQL (812) |
| Description: | Configures Petclinic to work with MySQL (814) |

Create   Cancel

Petclinic-Database

✏ Draft

| General | Endpoint: Petclinic_App | Endpoint: Database | Workflow |
|---|---|---|---|
| Requirements | Install | Configuration | Firewall | Reset |

Requirements for this end point — 1008

Required Software Bundles: +

| Universal ID | Version | Label | | |
|---|---|---|---|---|
| | | | | ✕ |
| com.mysql.mysql_server | 1.0.0 | MySQL_Server_5.5.11 | | ✕ |

— 1016

Supported Operating Systems: +

| Type | Distribution | Min version | Max version | |
|---|---|---|---|---|
| Linux | | | | ✕ |

Software prerequisites: +

| Product Name | Bundle Id | Min version | Max version |
|---|---|---|---|
| None defined | | | |

Parameter Setting and Mapping Dialog

*Please set the parameter type, its name and other relevant fields according to its type*

Parameter Type: [Input ▼] —1204

Name: [dbhostname] —1206

Default Value: [ ]

User Configurable: [✓] —1208

Source
Filter the parameters by selecting end point, context and operation

End Point: [Database ▼]
Context: [IBM Cloud Enablement Bund ▼]
Operation: [Configicon ▼]

⊙ hostname
○ ip_address

Target
Filter the parameters by selecting end point, context and operation

End Point: [ ▼]
Context: [ ▼]
Operation: [ ▼]

○ install_location
○ tomcat_port
○ hostname
○ ip_address
○ db_root_password

[< >]

[Add] [Cancel]

DESIGNING AND CROSS-CONFIGURING SOFTWARE

BACKGROUND

The present invention generally relates to software configuration, and more particularly relates to cross-configuring software with reusable software cross-configuration modules.

Cloud computing platforms and virtualization technologies enable the provisioning of computing utilities as a service. This includes, but is not limited to, infrastructure-as-a service (IaaS), platform-as-a-service (PaaS), or software-as-a-service (SaaS). Software providers, solution providers, and end-users commonly use pre-packaged software solutions that are provided as virtual images. These virtual images are pre-packaged with software that exposes a set of configuration parameters specific to certain software packages. The pre-packaged software is referred to as a composable software bundle (bundle) and represents a cloud independent description of software that captures those aspects needed to install and configure it in a virtual appliance/machine (VM). This description allows the bundle to be used to support image construction for multiple target cloud platforms. However, many distributed software applications require multiple virtual images for deployment and provisioning. Therefore, software on one virtual image generally needs to be cross-configured with software on another virtual image. Conventional configuration methods usually require a human to manually cross-configure software across multiple virtual images and even within the same virtual image. Manual cross-configuration of software is very time consuming, costly, and error prone.

BRIEF SUMMARY

In one embodiment, a computer program storage product for creating a cross-configuration software module for cross-configuring software entities is disclosed. The computer program storage product comprises instructions configured to perform a method. The method comprises obtaining a first set of requirements and at least a second set of requirements. Each of the first and second set of requirements identify at least one set of software entities required to be present on at least one system comprising software entities to be cross-configured. At least one set of operations is obtained. The at least one set of operations comprises at least one executable instruction that configures at least a first software entity with at least a second software entity. A first configuration definition is generated comprising at least the first set of requirements and the at least one set of operations. A second configuration definition is generated comprising at least the second set of requirements. The first and second configuration definitions are stored within a cross-configuration software module. The software configuration module cross-configures software entities within systems satisfying the set of requirements in the first and second configuration definitions.

In another embodiment, a computer program storage product for creating a cross-configuration software module for cross-configuring software entities is disclosed. The computer program storage product comprises instructions configured to perform a method. The method comprises retrieving a semantic representation of a set of systems capable of utilizing the cross-configuration software module. A functional representation of a set of operations is retrieved. Each operation in the set of operations is to be performed on a set of software entities associated with the set of systems during at least one connector life-cycle phase in a set of connector life-cycle phases. The set of operations cross-configure at least a first of the set of software entities with at least a second of the set of software entities. A set of artifacts comprising at least one of a set of metadata and a set of executable instructions associated with the set of operations are identified. The semantic representation, the functional representation, and the set of artifacts, are stored in the cross-configuration software module.

In yet another embodiment, a computer program storage product creating a virtual system pattern is disclosed. The computer program storage product comprises instructions configured to perform a method. The method comprises receiving a selection of at least one system comprising a set of software entities. A plurality of cross-configuration software modules is identified. Each cross-configuration software module comprises at least two configuration definitions each comprising at least a set of requirements and identifying at least one software module to be cross-configured. The set of software entities of the at least one system is compared to the set of requirements for each of the plurality of cross-configuration software modules. At least one of the plurality of cross-configuration software modules having the set of requirements being satisfied by at least two of the set of software entities of the at least one system is identified. The at least two software entities are automatically cross-configured based on the at least two configuration definitions of the at least one identified cross-configuration software module.

In yet another embodiment, a system for creating a cross-configuration software module for cross-configuring software entities is disclosed. The system comprises a memory and a processor that is communicatively coupled to the memory. A connector creation tool is communicatively coupled to the memory and the processor. The connector creation tool is configured to perform a method. The method comprises obtaining a first set of requirements and at least a second set of requirements. Each of the first and second set of requirements identify at least one set of software entities required to be present on at least one system comprising software entities to be cross-configured. At least one set of operations is obtained. The at least one set of operations comprises at least one executable instruction that configures at least a first software entity with at least a second software entity. A first configuration definition is generated comprising at least the first set of requirements and the at least one set of operations. A second configuration definition is generated comprising at least the second set of requirements. The first and second configuration definitions are stored within a cross-configuration software module. The software configuration module cross-configures software entities within systems satisfying the set of requirements in the first and second configuration definitions.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIGS. 8-12 illustrate various examples of a graphical user interface for creating a connector according to one embodiment of the present invention;

DETAILED DESCRIPTION

Operating Environment

Configuring software components/products on systems (e.g., virtual images, virtual appliances/machines, etc.) to work together can be challenging since system builders cannot anticipate at construction time how a system is to be used in a composite of systems. For example, configuring systems to deploy a distributed software application may require the installation of software components, installation scripts, and configuration scripts on one or more systems. The installation or configuration scripts on a particular system may require specific configuration parameters from configuration scripts on another system to be functional (such as the hostname or IP address). This requires a coordinated activation mechanism to customize the software on each system and propagate configuration parameters across systems.

Therefore, the cross-configuration of systems is a challenging task requiring numerous steps on all systems that need to be connected and configured. Conventional configuration mechanisms are mostly a set manual steps following some best practices. Software or solution experts manually configure each system that is part of the composition or by using pre-defined configuration scripts. This implies copying software artifacts, installation and configuration scripts to each system after its deployment; orchestrating the execution the required configuration scripts and ensuring that configuration parameters are set correctly. These manual steps are a key problem and increasing cost factor because of the inherent lack or re-use of systems, especially in large enterprises. The scalability of the manual approach is very low and it leads to non-repeatable installation and configuration procedures. Moreover, in virtualization environments numerous configuration parameters are only available when a virtual image has been deployed (such as the hostname that may be dynamically assigned). This requires the expert to manually enforce a certain startup order to be able to get certain configuration values. This is a time consuming task and repetitive task because it has to be done on each deployment of the application.

Figure 1:
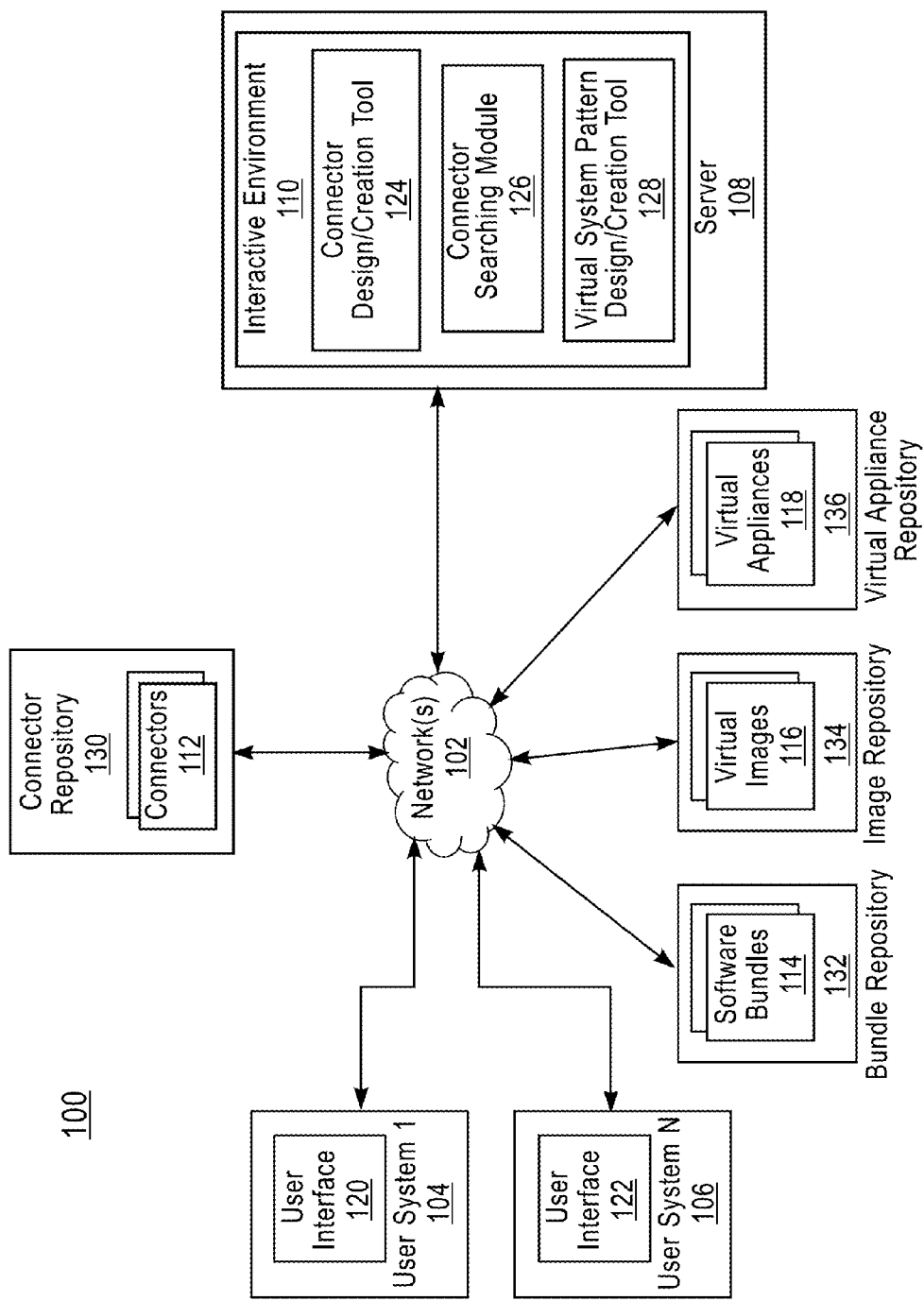
FIG. 1 is a block diagram illustrating one example of an operating environment according to one embodiment of the present invention.

Therefore, one or more embodiments provide an operating environment 100, as shown in FIG. 1, for automatically cross-configuring software components or software products (two or more software components) within one or more systems using semantically rich connectors. The operating environment of FIG. 1 can be a cloud computing environment or a non-cloud computing environment. FIG. 1 shows one or more networks 102 that, in one embodiment, can include wide area networks, local area networks, wireless networks, and/or the like. In one embodiment, the environment 100 includes a plurality of information processing systems 104, 106, 108 that are communicatively coupled to the network(s) 102. The information processing systems 104, 106, 108 include one or more user systems 104, 106 and one or more servers 108. The user systems 104, 106 can include, for example, information processing systems such as desktop computers, laptop computers, wireless devices such as mobile phones, personal digital assistants, and the like.

The server system 108 includes, for example, an interactive environment 110 for designing, creating, and deploying connectors 112 for cross-configuring software entities 114 (also referred to herein as "software components/products") present on or associated with one or more systems 116, 118. A connector 112 (which is also referred to herein as a "cross-configuration connector", a "configuration connector", and a "cross-configuration software module") represents a self-contained software package that automatically configures a software component(s)/product(s) 114 present on (or associated with) a given system 116, 118 for operation/interaction with another software component(s)/product(s) 114 present on (or associated with) another system 116, 118 (or within the same system). In one embodiment, the interactive environment 110 is the same as, part of, or separate from an environment/tool for designing and creating the systems and their software components/products. For example, the interactive environment 110 can be the same as, part of, or separate from an environment/tool for creating, designing, and/or deploying composable software bundle assets and virtual image assets. Examples of these environments/tools are given in the commonly owned U.S. application Ser. No. 13/036,588 entitled "Designing and Building Virtual Images Using Semantically Rich Composable Software Image Bundles", and the commonly owned U.S. application Ser. No. 12/895,461, entitled "Semantically Rich Composable Software Image Bundles", which are hereby incorporated by reference in their entireties.

Users of the user systems 104, 106 interact with the interactive environment 110 via a user interface 120, 122 or programmatically via an API. It should be noted that separate users systems are not required and a user can interact directly with the server 108 itself via a user interface at the server 108. Examples of a user interface are a web page, mashup, graphical user interface (GUI), a command line, etc.

The interactive environment 110, in one embodiment, comprises at least a connector design/creation tool 124, a connector searching module 126, and a virtual system pattern (VSP) design/creation tool 128. The connector design/creation tool 124 enables users to define and publish reusable connectors 112. Connectors 112, in one embodiment, are stored in a connector repository 130, which can be separate from or reside within the server 108. The connector searching module 126, in one embodiment, identifies connectors 112 from the repository 130 that can be used to cross-configure one or more systems 116, 118, as will be discussed in greater detail below. These identified connectors 112 can be automatically applied to the selected systems 116, 118 (by the interactive environment 110) or can be presented to a user via the user interface 120, 124 who can then select one or more of the connectors 112 to be applied to the systems 116, 118. Connectors 112 and their components are discussed in greater detail below.

A "system" capable of being cross-configured refers to any entity/environment on which one or more software components/products are present or coupled to. For example, FIG. 1 shows systems 116, 118 such as, but not limited to, virtual (machine) images 116, virtual appliances/machines 118, physical systems, etc. A virtual appliance (also referred to a "virtual machine") is a given software stack that is installed and configured to provision a particular application or platform to a third-party. This may require one or more virtual machine images and software stacks that can be instantiated on a particular virtualization environment (given that the virtual machine image format can be understood by the target environment). A virtual image (or virtual machine image) is a set of files that include a pre-configured operating system environment and an optional software stack. A virtual image can be instantiated by a virtualization environment.

One example of a software component/product (also referred to herein as a "software entity") is a software bundle 114. A software bundle is a cloud independent description of software that captures those aspects needed to install and configure it in a virtual machine. This description allows the bundle to be used to support image asset construction for multiple target cloud platforms. The metadata for each bundle describes one or more of: (1) the software's requirements and capabilities to ensure valid composition; (2) the install steps that need to be executed and their parameters as part of a virtual image build life-cycle phase; (3) the deploy time configuration steps that need to be executed and their parameters as part of a virtual image deploy life-cycle phase (4) the deploy time configurations that can be made with external software via virtual port definitions; and (5) the capture time cleanup steps that need to be executed and their parameters as part of a virtual image capture life-cycle phase. The metadata can comprise references to specific artifacts: scripts, binaries, response files, etc. These can be local references (the artifacts are contained in the bundle) or remote references (to a remote repository). It should be noted that other virtual image life-cycle phases such as, but not limited to, a start phase can be supported as well.

It should be noted that even though FIG. 1 shows software components/products as software bundles, any type of software component/product capable of being configured is applicable to embodiments of the present invention. The software bundles 114, virtual images 116, and virtual appliances 118 are stored within a separate repository 132, 134, 136. These repositories can be separate from the server 108 or one or more of these repositories can reside on the server 108. Also, the contents of two of more of these repositories can reside within a single repository as well. It should be noted that that virtual appliances 118 can comprise virtual images 116 and virtual images 116 can comprise software bundles 114. It should be noted that although the following discussion is directed to software bundles 114, virtual images 116, and virtual appliances 118, one or more embodiments of the present invention are not limited to the virtual domain. Any type of entity/environment on which one or more software components/products are present or coupled to is applicable to the various embodiments of the present invention.

Cross-Configuration Connectors

A connector 112, in one embodiment, represents a self-contained software package including semantic and functional model, artifacts, and scripts including, but not limited to, installation and configuration scripts. Connectors 112 comprise a set of endpoints that identify and describe the system(s) 116, 118 capable of being cross-configured by the connector 112. In one embodiment, these endpoints are represented as endpoint definitions comprising requirements on the systems in terms of software bundles to be installed on the instance of that system, specific software products to be installed on the system, operation system requirements, and hardware requirements.

The connectors 112 are advantageous because they provide separation of concerns and simplicity of use by encapsulating the connector logic into a reusable package. The packaging, in one embodiment, can be performed by a skilled specialist that has an in-depth understanding of the systems that can be connected. The resulting connector is made available for reuse by non-specialists. Connectors 112 enable standardization within an organization by leveraging standardized components such as bundles, virtual images, virtual appliances, and/or virtual system patterns (a composition of virtual images (or machines) bundles, and a connector(s)) more as basic building blocks. All of these components follow the same underlying modeling principles by having a semantic and functional topology that represents the semantically rich metadata. Connectors 112 can be re-used because they do not depend on a system, but depend on the endpoint software (i.e., the software that is installed/present on the system). Connectors 112 do not dictate the actual deployment topology. A connector 112 can be used to cross-configure software on single system as well as on different systems. Connectors 112 can be defined in a fine granular way. Multiple connectors 112 can be used to connect the same system to allow fine granular methods of encapsulating cross-configuration knowledge within a connector 112.

The design/creation tool 124 of the interactive environment 110 enables users to create a connector 112 by specifying endpoint definitions, their requirements on software bundles, software products and operating system requirements, as well as hardware requirement. The design/creation tool 124 also allows a user to specify installation and configuration operations that are executed as part of the connector execution at system activation time. Users are further able to specify parameter propagation from different endpoint definitions. These parameters can be configuration parameters of software bundles that are present at an endpoint or parameters of other configuration operations defined in the endpoint definition. These parameters may be required as input in the connector configuration scripts. Connectors 112 can be applied and executed at runtime in different virtualization environments. In this embodiment, the required software artifacts defined in a connector 112 for each endpoint are packaged and transferred it to the corresponding virtual image 116 (or virtual appliance 118) that matches the connector endpoint definition requirements. In addition, the necessary activation logic that can execute the connector installation and configuration upon creation time of the virtual image 116 is also generated.

Figure 2:
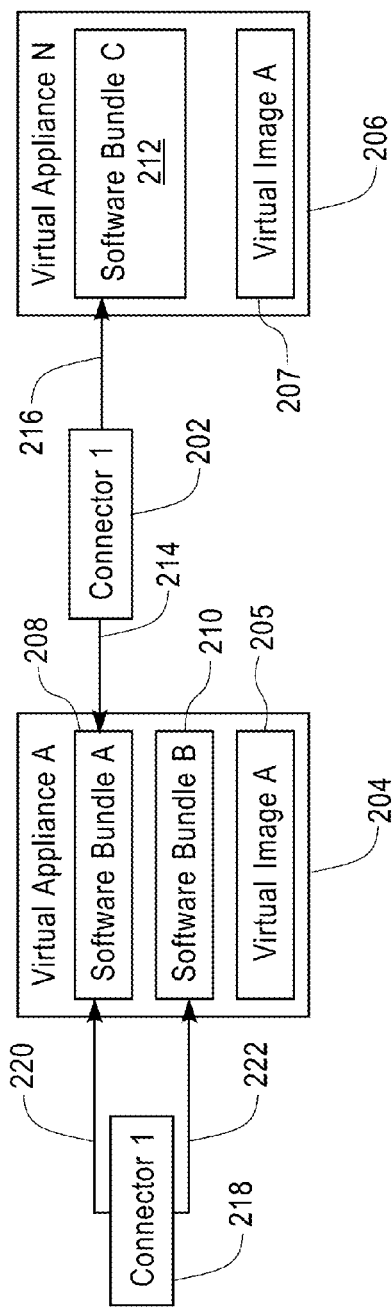
FIG. 2 illustrates one example of a connector that can be coupled to at least one system for cross-configuring its software entities according to one embodiment of the present invention.

In one embodiment, a connector 112 cross-configures systems by "connecting" to each of the selected systems and automatically configuring software components/products on one system with software components/products on another system (or the same system). Stated differently, a connector 112 connects two or more software components/products on one or more systems for cross-configuration purposes. For example, FIG. 2 shows that a first connector (Connector 1) 202 is coupled to two systems (Virtual Appliance A and Virtual Appliance N) 204, 206 comprising virtual images 205, 207 and software bundles 208, 210, 212. In particular, the first connector 202 configures Virtual Appliance A and Virtual Appliance N by configuring Software Bundle A on Virtual Appliance A to work with Software Bundle C on Virtual Appliance N, as indicated by the arrows 214, 216. FIG. 2 also shows a second connector (Connector 2) 218 coupled to two software components/products 208, 210 present on Virtual Appliance A. For example, the second connector 218 is coupled to Software Bundle A and Software Bundle B. Therefore, the second connector 218 configures Virtual Appliance A by cross-configuring Software Bundle A to work with Software Bundle B, as indicated by the arrows 220, 222. Examples of cross-configuration operations that can be performed by a connector include installing software components/products on each virtual appliance, executing a set of configuration operations on each virtual appliance, propagating values to be used for configuration or installation operations, configuring firewall rules, configuring reset operations (i.e., the clean-up log files or sensitive information), and the like.

Figure 3:
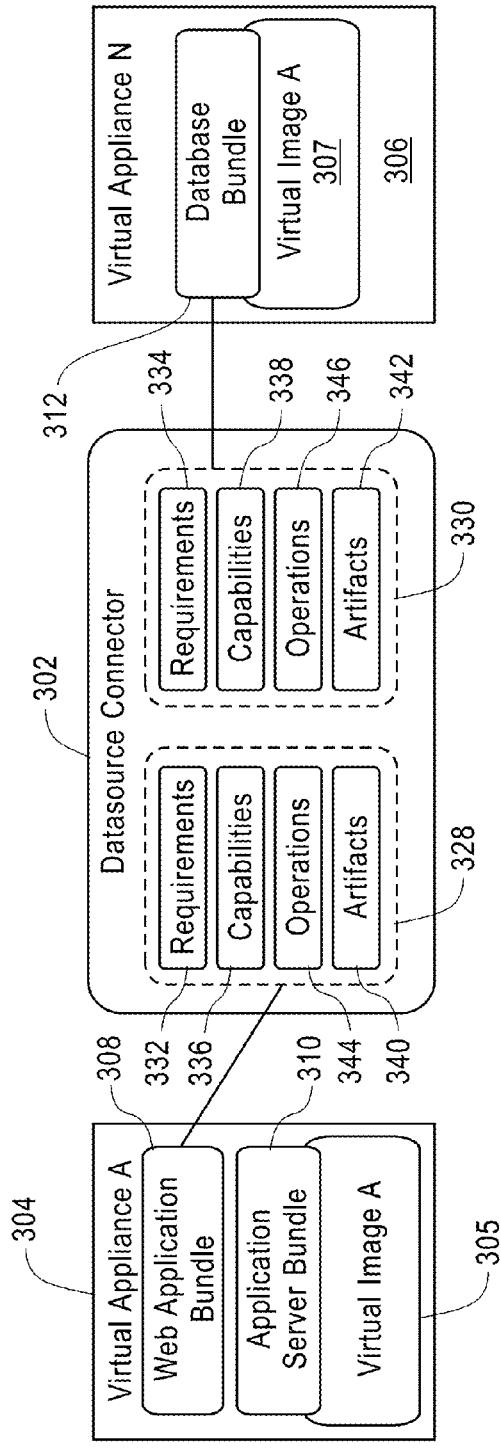
FIG. 3 illustrates a more detailed view of a connector according to one embodiment of the present invention.

FIG. 3 shows a more detailed view of a connector 302. In particular, FIG. 3 shows a connector 302 coupling a first virtual appliance 304 with a second virtual appliance 306 for cross-configuring a Web Application Software Bundle 308 on the first virtual appliance 304 with a Database Software Bundle 312 on the second virtual appliance 306. In this example, the first virtual appliance 304 comprises a first virtual image 305 comprising the Web Application Software Bundle 308 and an Application Server Software Bundle 310. The second virtual appliance 306 comprises a second virtual image 307 comprising the database software bundle 312. Each of these bundles 308, 310, 312 installs their own respective software. For example, the Web Application Software Bundle 308 installs a web application on the first virtual appliance 304. The connector 302 of FIG. 3 defines the cross-configuration logic for the web application 308 running on the Application Server 310 of the first virtual appliance 304, which requires the Database 312 running on the second virtual appliance 306. The connector 302, in this example, installs a database driver on the first virtual appliance 304 and is expressed as a capability in the connector 302.

As part of the cross-configuration logic, in this example, the connector 302 creates the appropriate data source configuration for the Web Application 308. For example, the connector 302 installs the database driver on the Application Server 310 and creates a special property file that instructs the Web Application 308 to use the Database 312 on the second virtual appliance 306. The connector 302 also propagates the hostname and port of the Database 312 to the Application Server 310. With respect to the database 312, the connector 302 creates the Database 312 and populates the database 312 with the database schema and initial data. It should be noted that these are only examples of configuration operations performed by the connector 302.

FIG. 3 shows that the connector 302 comprises at least two endpoint definitions 328, 330 (also referred to herein as "configuration definitions"), which are logical constructs that group requirements, capabilities, installation and configuration operations, and artifacts such as software binaries, scripts, etc. An endpoint is a system 114, 116 that satisfies the requirements of an endpoint definition(s) and can be coupled to the connector 302 based on that endpoint(s). The searching module 126 utilizes the requirements of an endpoint definition 328, 330, to identify a system 116, 118 that can be coupled to the connector 302 for cross-configuration, as will be discussed in greater detail below. A system 116, 118 can only be coupled to a connector 302 if it satisfies all requirements of at least one of the endpoint definition of the connector 302.

The requirements 332, 334 associated with an endpoint definition 328, 330 comprise one or more of software bundle requirements, software product requirements, operating system (OS) requirements, and hardware requirements. Software bundle requirements express requirements on zero or more software bundles that need to be present on a system 116, 118 that is being coupled to the connector 302. Software bundle requirements comprise a universal identifier associated with each required bundle. The universal identifier includes a name and a version of a given software bundle. The universal identifier ensures that a software bundle can be referenced in a unique way across different bundle repositories. An example of universal identifier for a software bundle is com.mysql.mysql-server_1.0.0, which universally and uniquely identifies a MySQL bundle with version 1.0.0. The specification of software bundle requirements can use different constraints to restrict the version of the bundle such as, but not limited to, version range constraints, constraints specifying a lower or upper bound of a specific version, or regular expressions of versions.

Software product requirements express requirements on zero or more software products that are present on a system to be coupled to the connector. One example of a software product requirement is "Software Product A v5+", which indicates that Software Product A with version 5 or higher needs to be present on a system 116, 118 being coupled to the connector 302. Operating system requirements express requirements on the operating system for a system 116, 118. This requirement is important because a connector 302 may install software that can only run on a specific platform (such as Linux RHEL v5+). Although software bundles also express requirements on the OS, these bundles might be written to support a variety of operating systems. By including OS requirements in each endpoint definition of the connector, the operating systems can be restricted to what is supported by the connector 302, installation scripts, and or configurations scripts.

Hardware requirements express requirements on a system to be coupled to the connector. One example is a requirement on the system processor speed indicating the minimum speed of the processor unit. Other examples are RAM size, available disk space, or speed of the network interface card (NIC). For example, a connector may install a software product that requires at least 4 GB or hard disk space to successfully operate.

Capabilities 336, 338 formally describe the software that is installed by the connector 302 on a particular system 116, 118 that matches the endpoint definition requirements 332, 334. Capabilities 336, 338 are included within an endpoint 328, 330 if the connector 302 requires additional software to be installed for configuring software components/products on a connected system 116, 118. This software constitutes a capability that will be installed on the system that satisfies the given endpoint definition's s requirements. Capabilities 336, 338 are identified by product identifier, a version, and a vendor name. It should be noted that in some instances a system 116, 118 coupled to the connector 302 may already include the software identified in a capability 336, 338. In this situation the software identified by the capability 336, 338 does not need to be installed on the system 116, 118.

For example, the requirements 332 of the first endpoint definition 328 can be the Application Software Bundle 310, Operating System A (e.g., Linux), and Hardware Requirement A (e.g., Intel Server) while a capability 336 can be the Web Application Software Bundle 308. In this example, the first virtual appliance 304 comprises these software bundle, OS, and hardware requirements and, therefore, can be connected to connector 302 at the first endpoint definition 332. In one embodiment, if the first virtual appliance 304 does not already include the Web Application Software Bundle 308, the connector 302 installs the Web Application Software Bundle 308 on the respective image 305 of the first virtual appliance 304 using one or more artifacts 340 such as software binaries, installation scripts, etc. for the Web Application Software Bundle 308. However, the connector 302 is not required to install this bundle 308. If the first virtual appliance 304 already comprises the Web Application Software Bundle 308 it does not need to be reinstalled unless the capability identifies a given version not present on the first virtual appliance 304.

FIG. 3 further shows that each endpoint definition 328, 330 defines artifacts 340, 342 and operations 344, 346. Artifacts 340, 342 represent content that can be locally copied into the system 116, 118, remotely executable content, as well as metadata and documentation content. Locally copied content can include scripts, installers, archives, and configuration files. Remotely copied content can include workflows. Connector artifacts 340, 342 are associated with a source location which can be local to the connector 302. In this embodiment, the file contents are packaged with the connector metadata, or reference a remotely accessible resource, such a pointer to the latest build of an application. Connector artifacts 340, 342 can also be associated with a target location, which can be dynamically updated based on the system 116, 118 that has connected to the connector 302. When the target location is specified, adding the bundle to a system 116, 118 results in the artifact's contents being copied. In addition to artifacts such as software binaries, scripts, etc. required in the above life-cycle phases, additional artifacts such as licenses, ownership, permissions, documentation, etc. associated with the new copy can also be specified. Artifacts are referenced from connector metadata model elements and, thus, semantic information can be inferred about their function.

With respect to operations 344, 346, an operation provides implementations of the logic that should be executed at specific life-cycle phases of the connector. In particular, operations can include logic to install software on a system 116, 118 and logic to configure the software. Operations are ordered and can be associated with parameters. Operation parameters can be associated with a name, label, description, a set of default values, or other items. Operations can further be assigned to execute in a specific stage of the connector life-cycle, which phases are used to model different lifecycles of the connector 302. Examples of connector lifecycle phases are a Connector_Install phase and Connector_Config phase. These phases are respectively used by the underlying execution environment of a system 116, 118 to install software on deployment and configure the installed software upon activation time. The Connector_Install phase defines how software is installed on the system 116, 118 matching a corresponding endpoint definition 328, 330 of the connector at deployment time. The deployment time is the time when a connector is instantiated (i.e., its life-cycle phases are executed) as part of a virtual system patterns execution. In one embodiment, the installation phase has at least one user defined script and zero or more parameters. The user defined script(s) is the entry point of the installation and performs all required steps to complete the installation of software (capabilities) on the endpoint. A connector 302 comprises a Connector_Install lifecycle phase for each endpoint definition 328, 330.

The Connector_Config phase defines how software is configured after the Connector_Install phase. An endpoint definition 328, 330 can include zero or more configuration operations 344, 346. Each operation 344, 346 defines at least one configuration script and a number of artifacts that it might need. A configuration script includes zero or more configuration parameters. The parameters to a script are either input or output parameters. The values of an input parameter can be user supplied and/or propagated from another parameter in a connected endpoint, the other connected endpoint, and/or a software bundle that is specified in the requirements 332, 334 of the endpoint definitions 328, 330 in the connector 302. Output parameters are produced by the script. The value of an output parameter can be propagated to any other parameter in the same connected endpoint, the other connected endpoint, and/or a software bundle that is specified in the requirements 332, 334 of the endpoint definitions in the connector 302. Additionally, parameter propagations between software bundles can be expressed as well. This allows a parameter to be passed from one software bundle to other software bundles, irrespective of whether they reside on the same system 116 or different systems 116, 118. This avoids a configuration operation being defined just to read the source parameter and assigning it to the target parameter.

As discussed above, the connector 302 can install additional software or configure software. Therefore, in some situations various ports such as a firewall port may need to be opened in the underlying execution environment to allow the cross-configured software to function properly (such as a cloud infrastructure that closes most of the ports by default). Therefore, the connector 302 can comprise a configuration operation that opens needed ports and also propagates port information to one or more software bundles.

Figure 4:
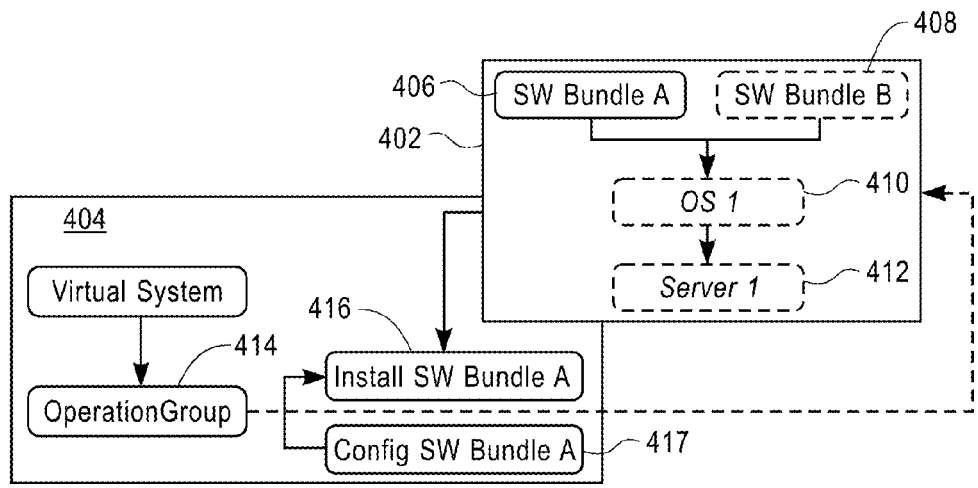
FIGS. 4-5 illustrates various examples of semantic and functional topologies of different software entities to be cross-configured according to one embodiment of the present invention.
Figure 5:
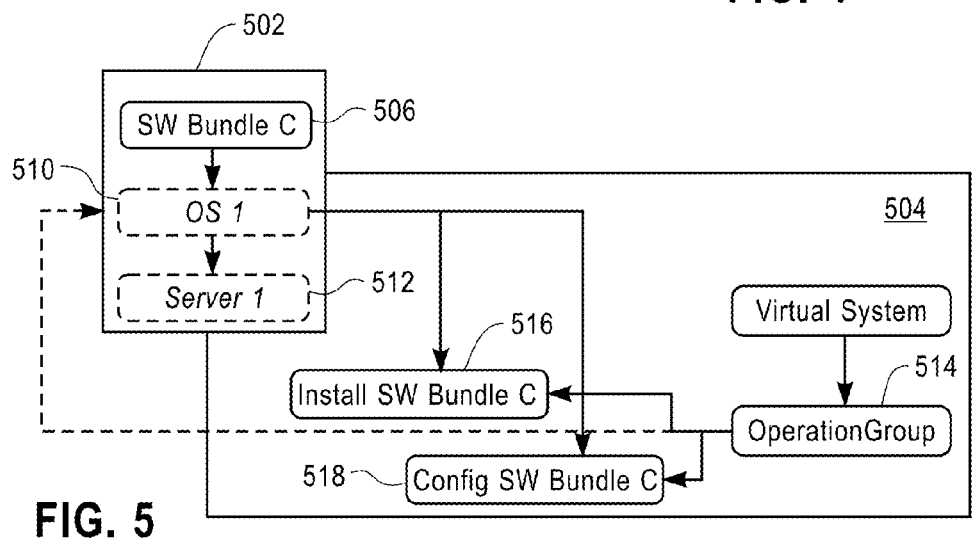

The components of the endpoint definitions 328, 330 of a connector are captured by the design/creation tool 124 using semantically rich metadata. For example, the design/creation tool 124 defines the structure of a connector in a semantic model (describing the what). The lifecycle operations are defined in a functional model (describing the how). In particular, the semantic topology/model of the connector describes both endpoints and, therefore, comprises two server units, two operating systems, and the software (capabilities) that is being installed as SoftwareInstall units. Consider a connector 112 that is being built for cross-configuring two software bundles, Software Bundle A (a web application) and Software Bundle C (a database). The topologies/models (both semantic and functional) for each of these bundles are shown in FIGS. 4 and 5. FIG. 4 represents the Software Bundle A topology and FIG. 5 represents the Software Bundle C topology, with the semantic model 402, 502 on top (linked to the operationGroup) of the functional model 404, 504. The semantic model 402 for the Software Bundle A endpoint has two software products, Software Bundle A 406 and Software Bundle B 408 (an application server). In this example, Software Bundle A is a capability (solid line), whereas Software Bundle B is a requirement (dashed line). The semantic model 402 of FIG. 4 further shows that the OS 1 410 (e.g., Linux) and Server 1 412 (e.g., Intel Server) units are requirements as well. Therefore, for a system 116, 118 to be connected to the connector 112 based on the endpoint represented by the semantic model 402 of FIG. 4 the system 116, 118 needs to have the Software Bundle B, OS 1, and Server 1 units installed thereon. The functional model 404 of Software Bundle A has an operationGroup 414 comprising only one install operation 416, which is an installation script that installs Software Bundle A. The operationGroup 414 comprises a configuration operation 417, which configures Software Bundle A. For example, Software Bundle A receives database host port information, db username and password information, etc. form Software Bundle C.

The semantic model 502 shown in FIG. 5 for the Software Bundle C endpoint has one software product 506, Software Bundle C, which is a capability (solid line), and two requirements 510, 512, the OS 1 and Server 1 units. The Software Bundle C endpoint does not require any other software bundle. Therefore, for a system 116, 118 to be connected to the connector 112 based on the Software Bundle C endpoint the system 116, 118 needs to have the OS 1 and the Server 1 units installed thereon. The functional model 504 of the Software Bundle C endpoint has an operationGroup 514 comprising only one install operation 516, which is an installation script for installing the Software Bundle C. The operationGroup 514 comprises one configuration operation 518, which is a configuration script that configures Software Bundle A to work with Software Bundle C. For example, the configuration script creates a special configuration file that instructs the Software Bundle A web application to use the Software Bundle C database on its respective system. The configuration operation 518 also propagates Software Bundle C database host port information, db username and password information, etc. to the Software Bundle A web application installed on its respective system.

Figure 6:
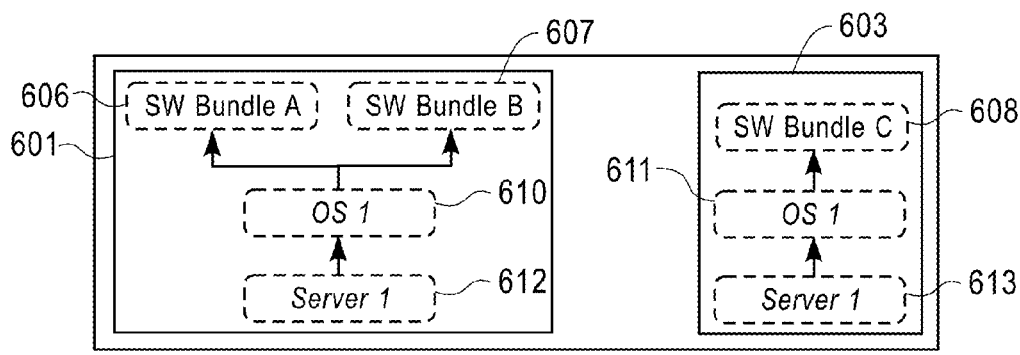
FIG. 6 illustrates one example of a semantic topology of a connector based on the semantic topologies of FIGS. 4-5 according to one embodiment of the present invention.

FIG. 6 shows the resulting semantic topology/model 602 for the Software Bundle A-Software Bundle C connector discussed above. The semantic topology/model 602 comprises two parts 601, 603, each representing one endpoint capable of being coupled to the connector for cross-configuration. The topology/model 602 comprises server units 612, 613, each having their OS unit, 610, 611. On top of the OS 610, 611, each part has software 606, 607, 608 that it requires to be present on the systems 116, 118 being connected to the connector. It should be noted that each of the SoftwareInstall units is marked as conceptual (dashed lines) in FIG. 6 because it has to be realized when matching again an image. Essentially, the connector semantic topology is the union of the bundle topologies that it connects in addition to turning all non-conceptual unit as conceptual.

Figure 7:
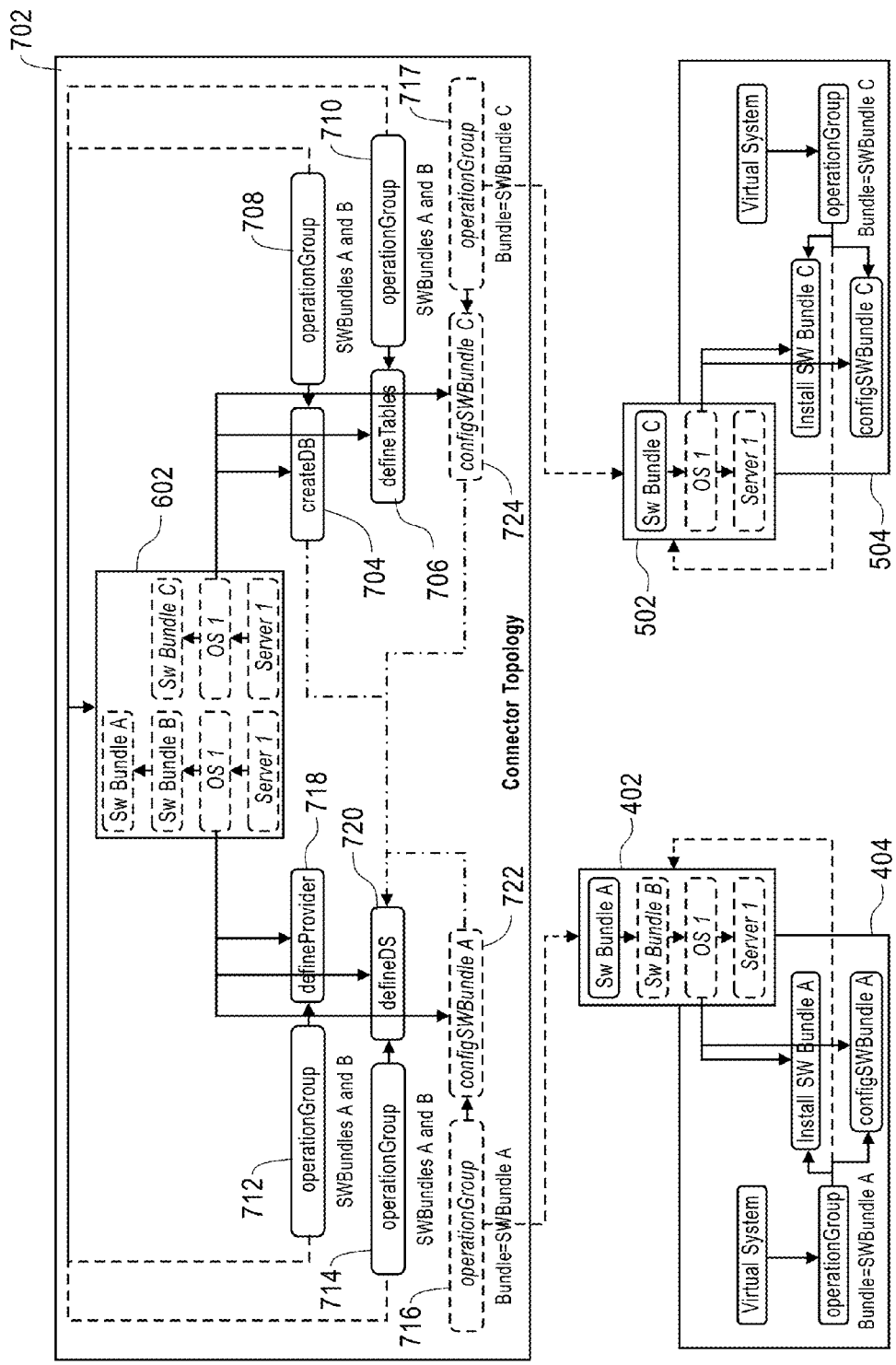
FIG. 7 illustrates one example of a functional topology of a connector based on the functional topologies of FIGS. 4-5 according to one embodiment of the present invention.

FIG. 7 shows the resulting functional topology/model 702 for the Software Bundle A—Software Bundle C connector with the topologies/models of FIGS. 4-6 to illustrate the links there between. The functional topology 702 of the connector 112 describes all the cross-configuration operations of the connector 112. In particular, the functional topology of FIG. 7 shows all the configuration operations that need to be executed to cross-configure Software Bundle A to work with Software Bundle C. The functional topology 702 describes what configuration operations need to be executed to install the software that is described in the semantic topology 602. This also involves parameter propagations between the configuration operations (the dash-dot lines in FIG. 7). For example, FIG. 7 shows operations such as createDB 704 and defineTables 706 on the Software Bundle C endpoint. Each of these operations is associated with an operationGroup 708, 710. FIG. 7 also shows operations such as defineProvider 718 and defineDS 720 on the Software Bundle A endpoint. Each of these operations is associated with an opeationGroup 712, 714. To realize parameter propagations between different configuration operations, the functional topology/model 702 includes every runOperation unit from a bundle or connector operation as a conceptual unit in the topology, if it is the source or target of a parameter propagation. For example, the configSWBundleA operation 722 of the connector requires the DB hostname. These operations are defined in the bundles that the connector requires. Therefore, these operationGroups 716, 717 and their units 722, 724 are represented in the functional topology and marked as conceptual (dashed boxes). These operations can either be realized by the required bundles itself or any other compatible bundle that provides the same set of configuration operations and parameters.

As shown above, a connector provides the ability to connect two or more software components/products on a system(s) for cross-configuration purposes. Connectors use the notation of an endpoint definition to define where (on which system) specific configuration steps are to be executed. Generally, a connector can comprise software and configuration scripts, define requirements and capabilities, and install other artifacts that are specific to one endpoint definition. Connectors are decoupled from specific software components that are installed on virtual appliance to allow a better reusability. Connectors only encapsulate configuration logic that is specific for cross-configuring two separate software bundles. Connectors are not dependent on the system itself because requirements for an endpoint are defined on a bundle and product level only. Connectors can be used independently whether the bundles are placed on the same or different virtual image.

Creating a Cross-Configuration Connector

The following provides an illustrative example of creating a connector 112. As the user interacts with the connector design/creation tool 124 various windows are displayed to the user via the user interface 120. It should be noted that although FIGS. 8-12 show a graphical user interface (GUI) for entering information, other forms of entering information such as (but not limited to) command lines are applicable as well. FIG. 8 shows a window 802 that allows that user to enter general properties for a new connector. In this example, the user is creating a connector that configures a Petclinic web application on a first system to work with the MySQL database on a second (or the same) system. This connector installs the MySQL driver JAR on a Tomcat application server of the first system and also creates a special property file that instructs the Petclinic web application to use the MySQL database on the second system. This connector also propagates the host port information, database (DB) username, and password information of the MySQL database to the Petclinic web application.

FIG. 8 shows that the design/creation tool 124 provides a connector name field 804 for entering a connector name, a universal ID field 806 for entering a universal ID, a version field 808 for entering version information, an endpoint name fields 810, 812 for entering names for each of the endpoints to be defined for the connector, and a description field for entering a description of the connector. The universal ID information uniquely identifies a connector and is used (along with the version information) to reference a connector in a virtual system pattern, which is discussed in greater detail below. The endpoint names are used to identify endpoints associated with a connector and to support parameter propagation between the endpoint parameters.

Figure 9:
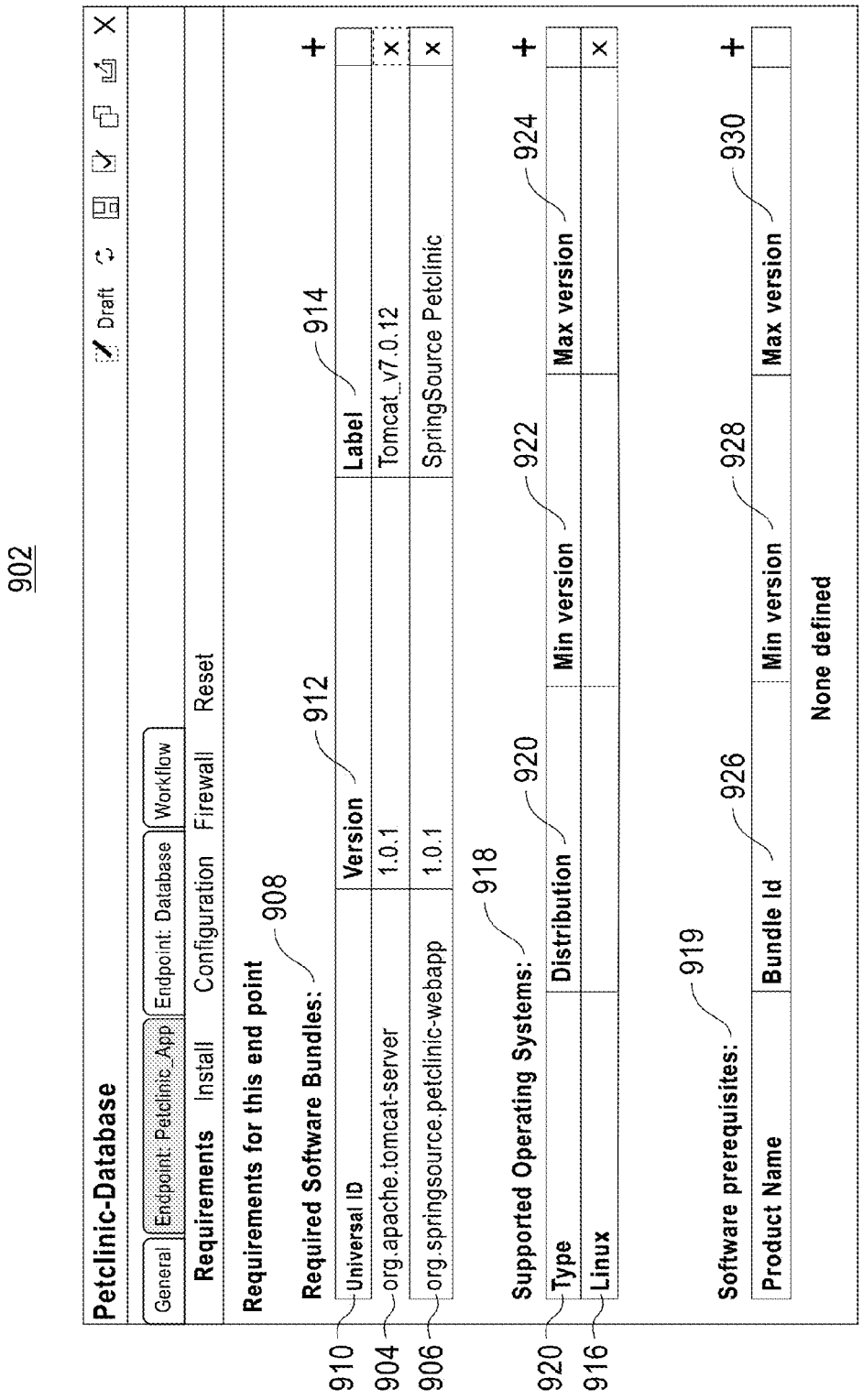

In FIG. 9, the user begins to create an endpoint definition by defining one or more of the requirements discussed above with respect to FIG. 3. In particular, the user is defining requirements for the Petclinic endpoint of the connector. FIG. 9 shows that the user has defined two software bundle requirements and one operating system requirement. For example, FIG. 9 shows that the user has defined two software bundle requirements 904, 906 within a software bundle requirement section 908 of the window 902. The first software bundle requirement 904 is for the Tomcat 7 application server and the second software bundle requirement 906 is for the Petclinic web application. FIG. 9 also shows that the user has entered universal IDs, version information, and labels (names) for each software bundle requirements 904, 906 within their respective fields 910, 912, 914. The user has also defined one operating system requirement 916 (Linux OS) within the OS requirement section 918 along with type information, distribution information, minimum version information, and maximum version information within their respective fields 920, 922, 924 if applicable. A software prerequisite section 919 allows the user to enter requirements on a particular on a particular software product that has to be present on the system. Prerequisites can be a specific bundle (with a specific universal id+version, a particular product that is provided as a capability of a bundle, etc. Information such as bundle ID, minimum version information, and maximum version information can be entered within their respective fields 926, 928, 930, if applicable. It should be noted that hardware requirements can also be similarly entered. It should also be noted that capabilities can be implicitly defined by specifying a product that the endpoint installs (this is the capability) under one or more tabs in the user interface.

FIG. 10 shows one example of a user entering endpoint definition requirements for the MySQL endpoint similar to that discussed above with respect to FIG. 9. For example, the user has defined one software bundle requirement 1004 and one operating system requirement 1016 within the software bundle requirement section 1008 of the window 1002. For example, FIG. 10 shows that the software bundle requirement 1008 is for the MySQL database software bundle. Stated differently, there is a requirement on the software bundle that provides the MySQL software product as a capability on a system 114, 116. The connector requires this bundle to be present on a system 114, 116 that is being coupled to the connector. The universal ID, version information, and label (name) of the software bundle requirement is also provided by the user similar to that discussed above with respect to FIG. 9. The user has also defined one operating system requirement 1018 (Linux OS) within the OS requirement section 1019 along with type information, distribution information, minimum version information, and maximum version information within their respective fields.

On the Petclinic endpoint there are two tasks. The first task is to install the MySQL connector JAR file and the second task is to perform a configuration operation that creates the jdbc.properties file in the Petclinic application that is deployed on the Tomcat application server. Therefore, the user needs to define installation and configuration operations/scripts for the Petclinic endpoint. Specifying installation and configuration operations/scripts on endpoints means that configuration is performed on each of endpoint at deployment time. It is also possible that only one endpoint needs configuration whereas the other endpoint does not. Each installation and configuration script can have 0 . . . * parameters that need to be specified and defined by the connector creator. These parameters can either be queried from the user upon deployment or they can be mapped from a parameter of a bundle on one of connected systems or a depending connector configuration operation. This is defined as a parameter propagation rule that is resolved at deployment time.

Figure 11:
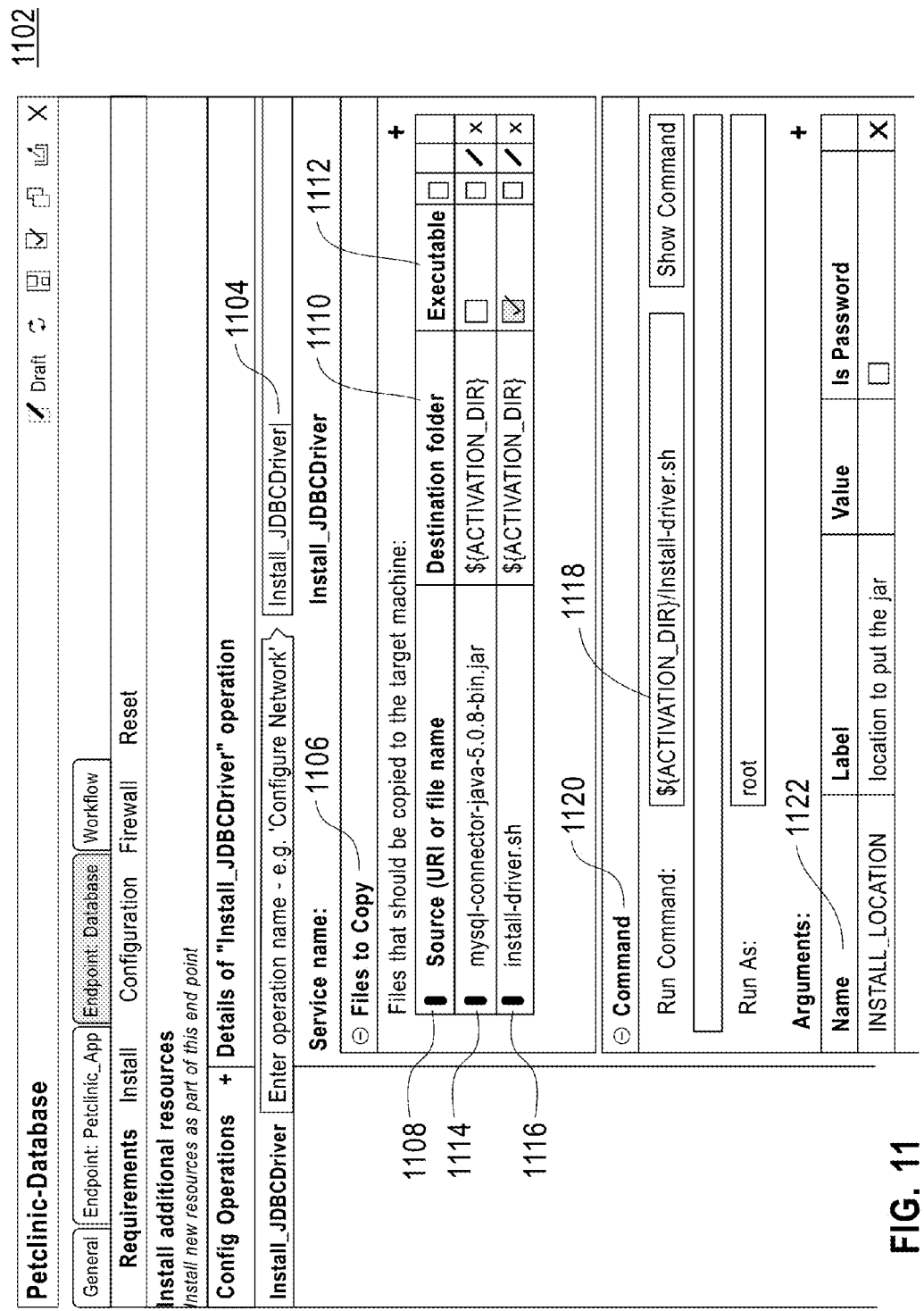

FIG. 11 shows one example of the user defining an install operation for the Petclinic endpoint to install the JDBC driver using an "Install" window 1102 provided by the design/creation tool 124. FIG. 11 shows an operation field 1104 that allows the user to enter a name for the given operation. In this example, the user has entered "Install_JDBCDriver" in this field 1104. In another section 1106 the user is able to enter various files that are to be copied to the system connecting to the Petclinic endpoint of the connector. The user is able to provide the source (URI or file name) 1108, the destination folder 1110, and information 1112 as to whether or not the corresponding file is an executable file. For example, FIG. 11 shows that the user has identified two files 1114, 1116 (mysql-connector-java-5.0.8-bin.jar and install-driver-sh) that should be copied to the ${ACTIVATION_DIR} directory of the connected system. The user can also provide a run command 1118 and how the file should be run (e.g., root) for any executable file in a command section 1120 of the window 1102. An arguments section 1122 allows the user to specify 0 . . . * parameters for an installation and configuration script. In this example, the script 'install-driver.sh' has one parameter INSTALL_LOCATION on the system. Parameter values are either specified in this dialog as default values, upon deployment by the user or by defining a parameter propagation rule from another parameter to this specific parameter.

As discussed above, the Petclinic Application also has a configuration task, which creates the jdbc.properties file in the Petclinic application that is deployed on the Tomcat application server. This configuration operation is defined by the user via a "Configuration" window (not shown) of the design/creation tool 124. The process for defining a configuration operation is similar to the process for defining an install operation, as discussed above with respect to FIG. 11. If a configuration operation to be performed on a first connected system requires values/parameters (e.g. hostname of the MySQL database) from a second connected system (or the first system), the user is able to define arguments to the configuration operation script and define its source using the design/creation tool 124.

For example, FIG. 12 shows a window 1202 in which the user can define the input parameter to the configuration script and its type. For example, FIG. 12 shows a parameter type field 1204 in which the user has selected "Input" as the type and has also entered the name of the required parameter "dbhostname" in another field 1206. The user then defines the source where the dbhostname parameter is to get its value from under a Source section 1208 of the window. For example, in this example, the "hostname" parameter of the ConfigIcon operation has the hostname and runtime required by the configuration operation defined for the Petclinic endpoint.

Similar operations can be performed for defining/specifying installation and configuration operations for the MySQL endpoint. However, in this example, the MySQL endpoint does not require installation or configuration operations. It should be noted that for each endpoint definition representing an endpoint (e.g., a system that is capable of connecting to the connector), optional firewall rules can be specified using the design/creation tool. Firewall rules may be necessary because the cross-configuration might require a specific port to be open. For example, a database that is accessed from another host needs to have the port open, which is generally not the case when accessing it from the local machine via a named pipe). At deployment time, the ports identified in a firewall rule are opened on the underlying system that matches the corresponding endpoint definition. Licenses can also be specified for a connector to ensure that the user accepts them at deployment time. This may be necessary because a connector can install additional software as part of the installation phase.

Once the user has finished entering the information shown in FIGS. 8-12, the design/creation tool 124 captures the entered information as semantic and functional models as discussed above with respect to FIGS. 4-7 and stores these models within their respective connectors 112 in the repository 130. Alternatively, these models can be stored separate from the connectors 112 within the same repository, different repository, or on the server 108.

Connector Matchmaking and Deployment

Figure 13:
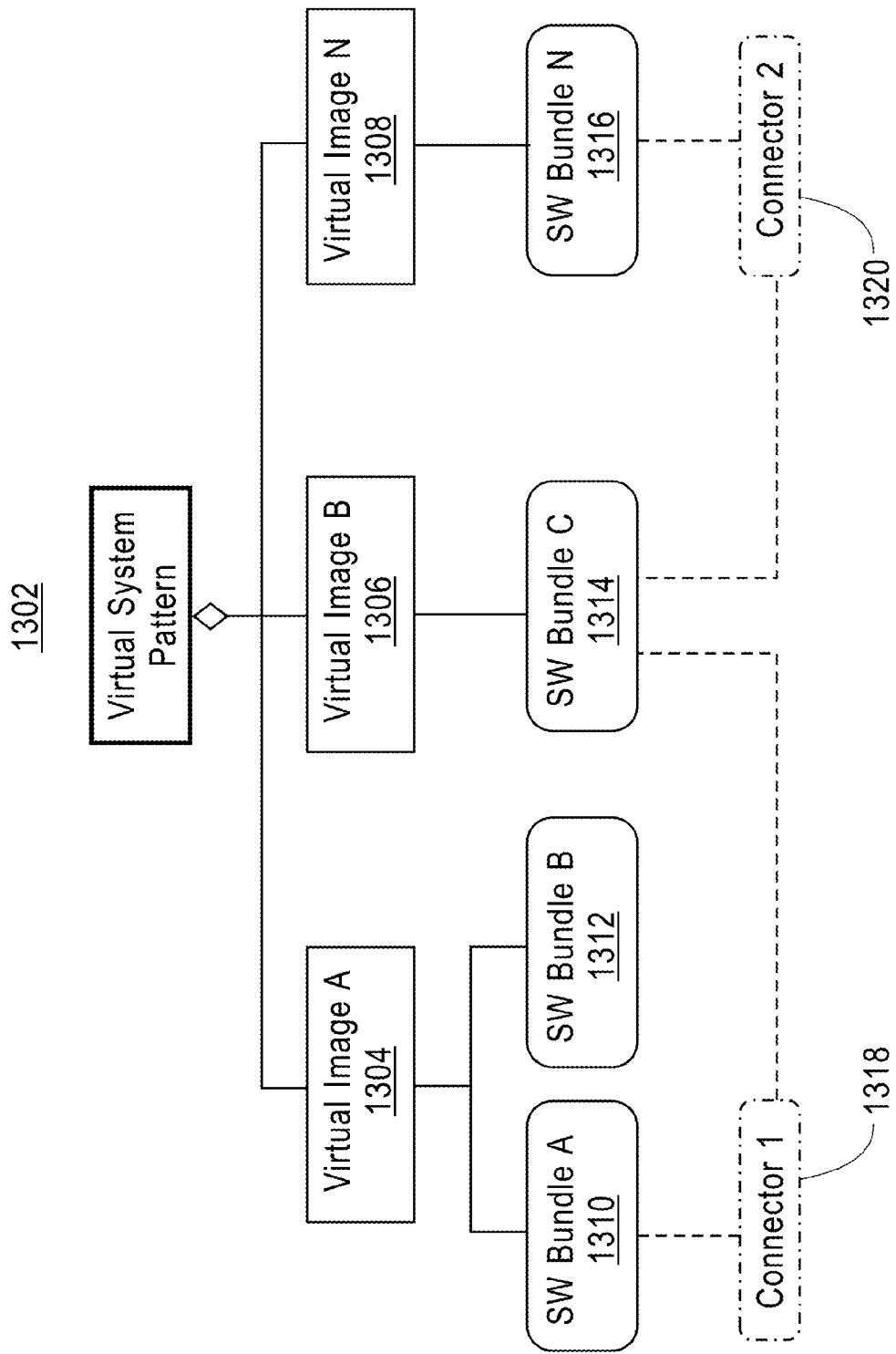
FIG. 13 illustrates one example of a virtual system pattern according to one embodiment of the present invention.

The cross-configuration connectors discussed above can be used in different contexts and environment. One use case for connectors is in the modeling and deployment of complete application topologies (i.e., virtual system patterns) using virtualization technologies. These application topologies can require complex cross-configuration for successful provisioning. In one embodiment, these application topologies can be modeled visually allowing a user to connect different pre-built virtual images (or appliances) by using a set of available connectors. FIG. 13 shows one example of a virtual system pattern 1302. In particular, FIG. 13 shows a virtual system pattern 1302 comprising a plurality of virtual images 1304, 1306, 1308 (and/or virtual appliances). Each virtual image 1304, 1306, 1308 comprises one or more software bundles 1310, 312, 1314, 1316. The virtual system pattern 1302 also comprises one or more connectors 1318, 1320 for cross-configuring two or more software bundles 1310, 312, 1314, 1316 within one or more virtual images 1304, 1306, 1308.

When creating a virtual system pattern, the connector searching module 126 identifies one or more connectors 112 from the connector repository 130 that can connect two systems 116, 118 such as (but not limited to) virtual images and virtual appliances selected by the user. In another embodiment, the connector searching module 126 identifies one or more systems 116, 118 that can be connected to a selected connector 112. The connector searching module 126 identifies systems 116, 118 that satisfy the requirements 332, 334 of the connector endpoint definitions, as discussed above. For example, the connector searching module 126 determines the capabilities of the underlying virtual images (i.e., the software bundles and their versions) and compares these capabilities against the requirements 332, 334 (bundle requirements, software products requirements, operating system requirements, and/or hardware requirements) of the connectors 112. When a successful match is identified, the given connector(s) 112 are displayed to a user via the user interface 120, 122. A selection is received from the user of or more of the matching connectors 112. The software entities (e.g., components such as software bundles 114) identified by each of the selected connectors 112 are then automatically cross-configured by the selected connectors 112.

The following provides a more detailed example on deploying a connector 112. When a successful match is identified by the searching module 126, the given connector 112 can be used to connect the systems 116, 118. After determining what connectors 112 are useable, a deployment component can initiate the deployment of a connector 112. Deployment of a connector 112 comprises the installation of the necessary software artifacts (if present) on the connected system(s) (e.g., the virtual image(s) determined in the matchmaking phase). Deployment also comprises the generation of the necessary activation scripts to invoke the connector configuration scripts. The generation of activation artifacts is specific to underlying activation mechanism supported by the target virtualization environment.

Two different modes of deployment can be used, Deployment using Capture and On-demand Deployment. In the Deployment using Capture mode, a connector 112 is deployed on the systems 116, 118 when these systems are built by a system builder (e.g., a virtual image builder). The connector artifacts 340, 342 are installed and configured on the corresponding systems that match the endpoint definition requirements 332, 334. In case of a connector 112 with two images, these can be either on the same virtual image or on two separate images. The connector installation artifacts (software+scripts) are installed before the image is captured and the necessary activation scripts are generated to invoke the connector configuration scripts. This allows correct activation of the connector configuration upon deployment of the virtual image. After the installation, the systems 116, 118 can be captured by using the underlying capture mechanism of the target virtualization environment. Connectors 112 can also have deployment parameters that allow user to configure certain software components. The target virtualization environment should provide appropriate support for querying those parameters from the user and also pass those parameters to the underlying activation mechanism of the systems. In addition, connectors 112 may enforce a specific startup order that needs to be enforced by the virtualization environment to enable proper activation.

With respect to the On-demand Deployment mode, capturing the systems is not required. Connector artifacts 340, 342 are transferred to the systems 116, 118 to enable installation and configuration upon activation time. This involves the execution of the installation as well as the configuration scripts upon activation of the systems. Thus, activation artifacts are generated for the installation and configuration scripts and the correct order of execution is ensured. Similar to the Deployment using Capture mode, connector deployment parameters may need to be supported and a specific startup order may need to be enforced.

Figure 14:
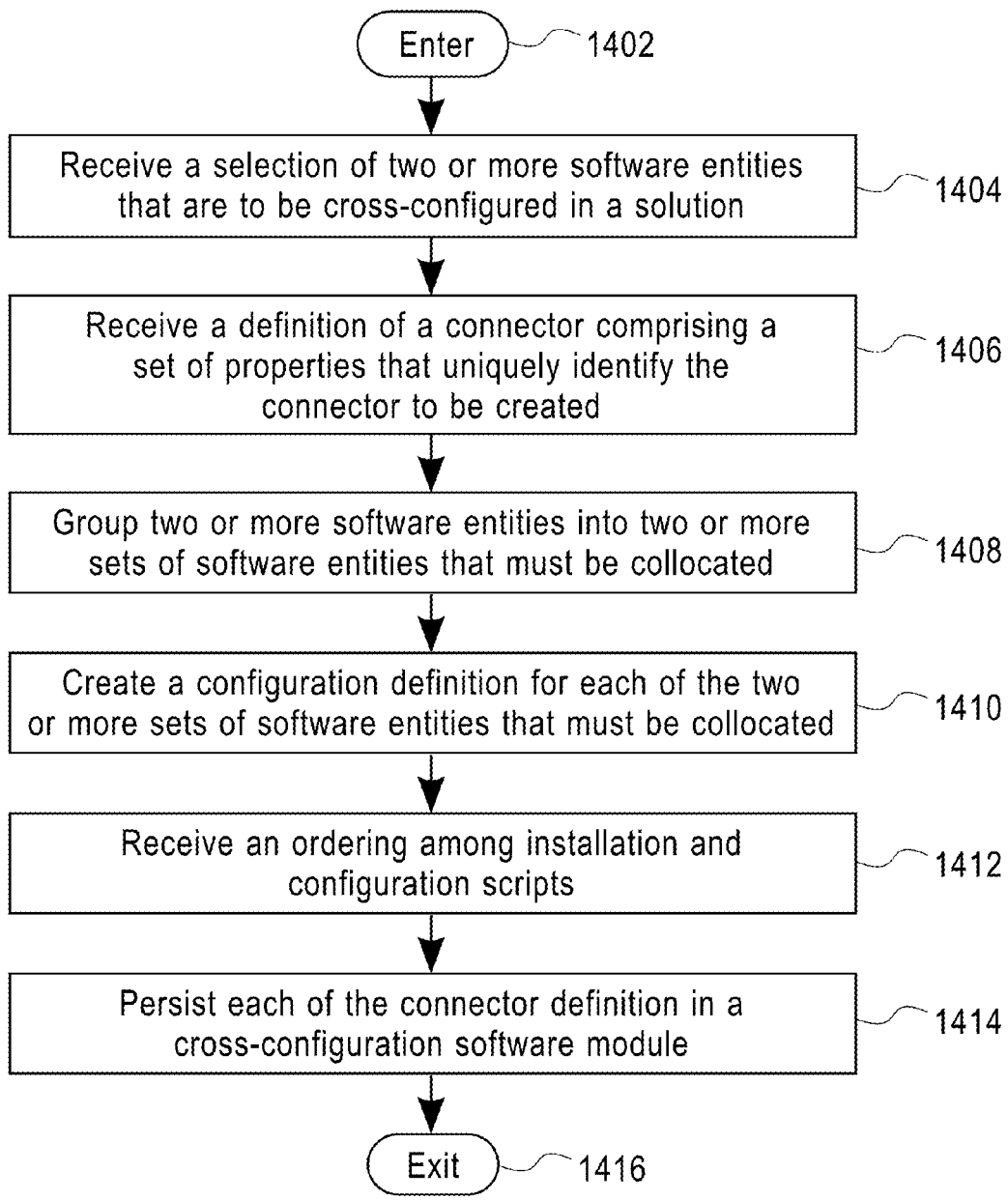
FIG. 14 is an operational flow diagram illustrating one process of creating a connector according to one embodiment of the present invention.

FIG. 14 is an operational flow diagram illustrating one example of creating a connector 112 (cross-configuration software module). The operational flow begins at step 1402 and flows directly to step 1404. The connector design/creation tool 124, at step 1404, receives a selection of two or more software entities 114 (e.g., software components, products, bundles, etc.) that are to be cross-configured in a virtual pattern system. The connector design/creation tool 124, at step 1406, receives a definition of a connector 112 comprising a set of properties that uniquely identify the connector 112. The two or more software entities 114, at step 1408, are grouped into two or more sets of software entities that must be collocated. The connector design/creation tool 124, at step 1410, creates a configuration definition for each of the two or more sets of software entities that must be collocated. The connector design/creation tool 124, at step 1412, receives an ordering among installation and configuration scripts. The connector design/creation tool 124, at step 1414, persists each of the connector definitions in a cross-configuration software module comprising, for example, a semantic and functional topology 602, 702. The control flow then exits at step 1416.

Figure 15:
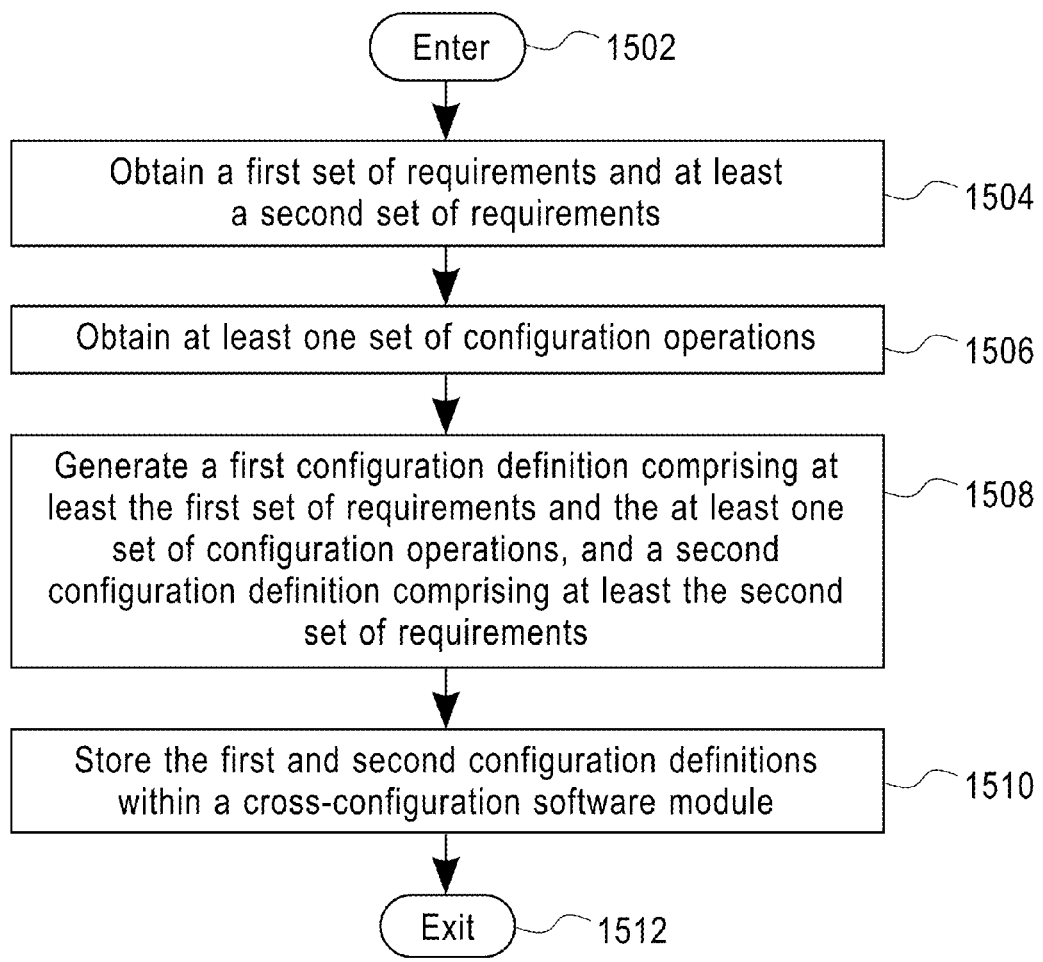
FIG. 15 is an operational flow diagram illustrating one process of creating a configuration definition for a connector according to one embodiment of the present invention.

FIG. 15 is an operational flow diagram illustrating one example of creating a configuration definition. The operational flow begins at step 1502 and flows directly to step 1504. The connector design/creation tool 124, at step 1504, obtains a first set of requirements and at least a second set of requirements. Each of the first and second set of requirements identify at least one of a set of software entities and a set of hardware components required to be present on at least one system 116, 118 comprising software entities to be cross-configured. Requirements can also include operating system requirements as well.

The connector design/creation tool 124, at step 1506, obtains at least one set of configuration operations. The at least one set of configuration operations comprises at least one executable instruction/script that configures at least a first software entity with at least a second software entity. It should be noted that installation operations comprising at least executable instruction/script can also be obtained. Also, each script can take a set of parameters. The script command, parameter style, executing user, artifacts that a script requires, and dependencies between scripts and parameters can also be obtained as well.

The connector design/creation tool 124, at step 1508, generates a first configuration definition comprising at least the first set of requirements and the at least one set of configuration operations, and a second configuration definition comprising at least the second set of requirements. In addition, each of the configuration definitions can also include/identify software products that each definition installs, firewall rules, and license agreements. The connector design/creation tool 124, at step 1510, stores the first and second configuration definitions within a cross-configuration software module, wherein the software configuration module is usable by systems 116, 118 satisfying the set of requirements in the first and second configuration definitions for cross-configuring software entities. The control flow then exits at step 1512.

Figure 16:
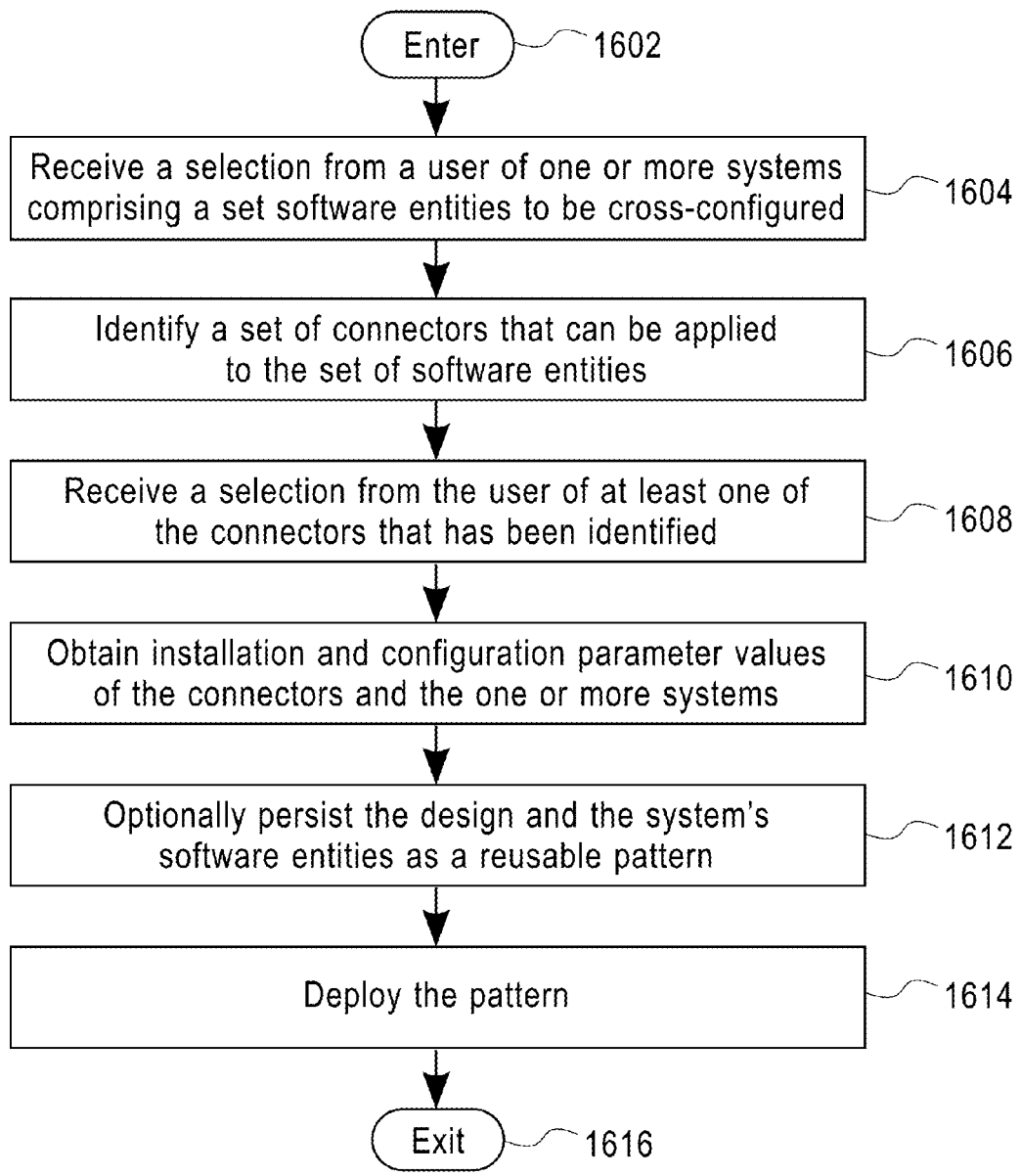
FIG. 16 is an operational flow diagram illustrating one process of deploying/using a connector according to one embodiment of the present invention.

FIG. 16 is an operational flow diagram illustrating one example of deploying/using a connector. The operational flow begins at step 1602 and flows directly to step 1604. The connector searching module 126, at step 1604, receives a selection from a user of one or more systems 116, 118 comprising a set software entities 114 to be cross-configured. The connector searching module 126, at step 1606, identifies a set of connectors 112 that can be applied to the set of software entities 114. The connector searching module 126, at step 1608, receives a selection from the user of at least one of the connectors 112 that has been identified. It should be noted that, in one embodiment, the searching module 126 can automatically select one or more connectors 112 without user intervention. The VSP design/creation tool 128, at step 1610, obtains installation and configuration parameter values of the connectors and the one or more systems 116, 118. The VSP design/creation tool 128, at step 1612, optionally persists the design, which includes the selected connector 112, the parameter values, and the system's software entities 114, as a reusable pattern. The VSP design/creation tool 128, at step 1614, deploys the pattern. The control flow then exits at step 1616.

Figure 17:
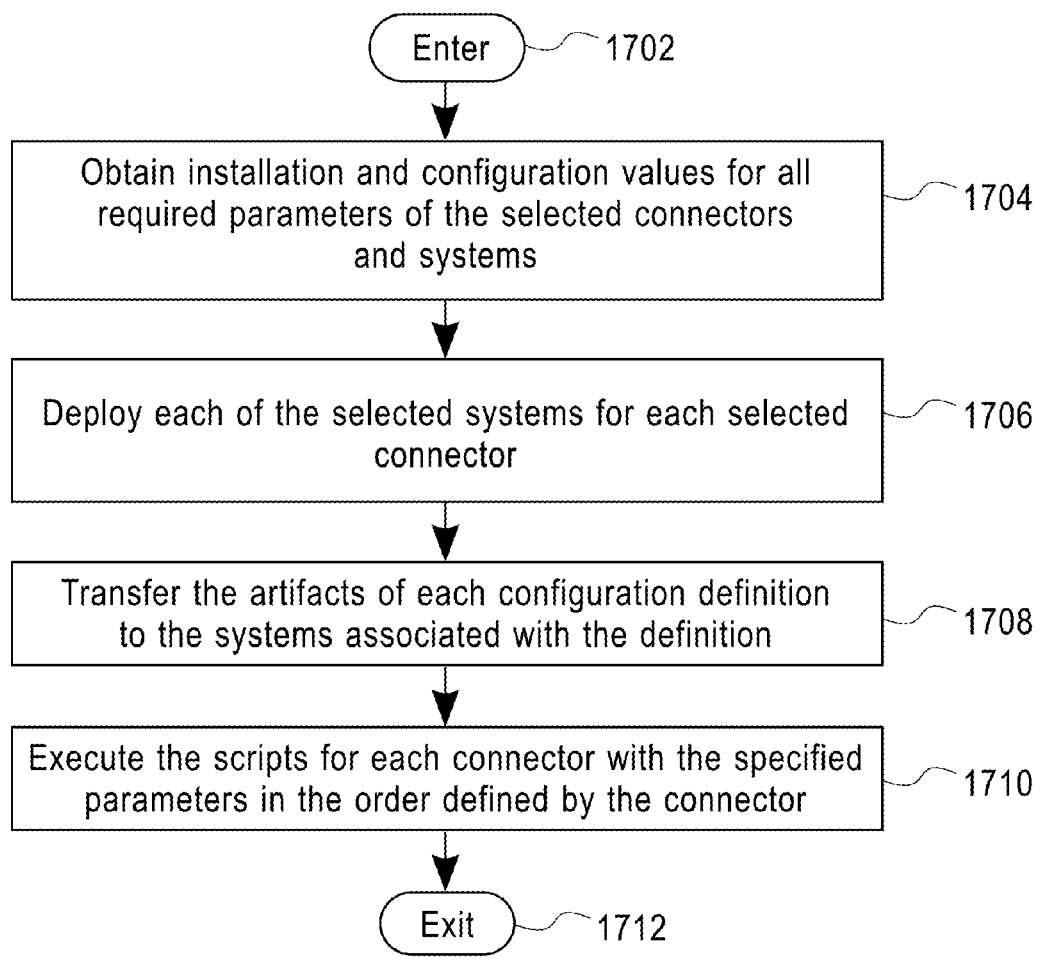
FIG. 17 is an operational flow diagram illustrating one process of deploying a virtual system pattern according to one embodiment of the present invention.

FIG. 17 is an operational flow diagram illustrating one example of deploying/using a connector at step 1614 of FIG. 16. The operational flow begins at step 1702 and flows directly to step 1704. The VSP design/creation tool 128, at step 1704, obtains installation and configuration values for all required parameters of the selected connectors 114 and systems 116, 118. The VSP design/creation tool 128, at step 1706, deploys each of the selected system for each selected connector 112. The VSP design/creation tool 128, at step 1708, transfers the artifacts of each configuration definition to the systems associated with the definition. The scripts of each connector 112, at step 1710, are executed with the specified parameters in the order defined by the connector 112. The control flow then exits at step 1712.

Cloud Environment

It is understood in advance that although the following is a detailed discussion on cloud computing, implementation of the teachings recited herein are not limited to a cloud computing environment. Rather, various embodiments of the present invention are capable of being implemented in conjunction with any other type of computing environment now known or later developed. For example, various embodiments of the present invention are applicable to any computing environment with a virtualized infrastructure or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present invention are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or by a third party, and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 18:
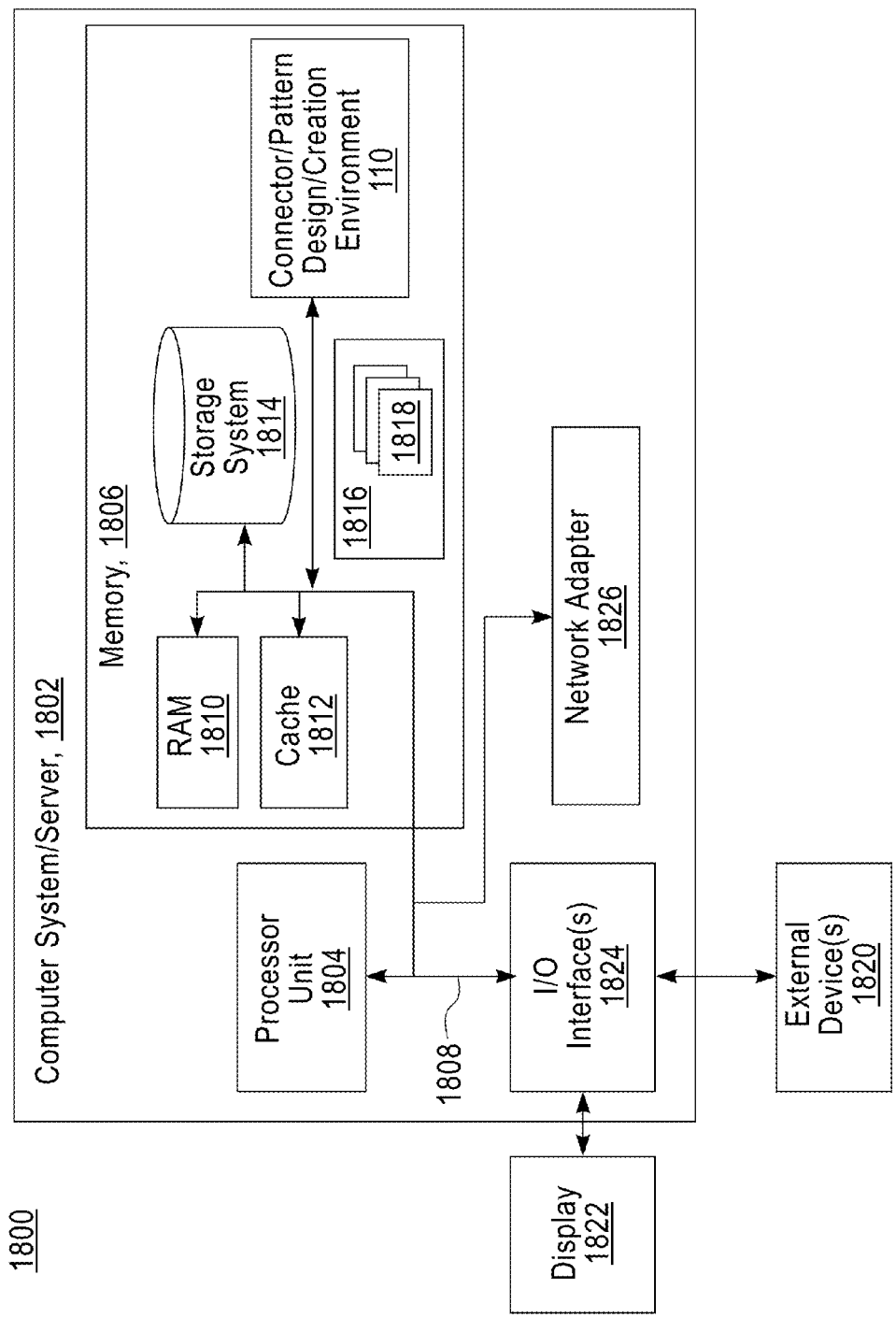
FIG. 18 illustrates one example of a cloud computing node according to one embodiment of the present invention.

Referring now to FIG. 18, a schematic of an example of a cloud computing node is shown. Cloud computing node 1800 is only one example of a suitable cloud computing node and is not intended to suggest any limitation as to the scope of use or functionality of embodiments of the invention described herein. Regardless, cloud computing node 1800 is capable of being implemented and/or performing any of the functionality set forth hereinabove.

In cloud computing node 1800 there is a computer system/server 1802, which is operational with numerous other general purpose or special purpose computing system environments or configurations. Examples of well-known computing systems, environments, and/or configurations that may be suitable for use with computer system/server 1802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 18, computer system/server 1802 in cloud computing node 1800 is shown in the form of a general-purpose computing device. The components of computer system/server 1802 may include, but are not limited to, one or more processors or processing units 1804, a system memory 1806, and a bus 1808 that couples various system components including system memory 1806 to processor 1804.

Bus 1808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1802 typically includes a variety of computer system readable media. Such media may be any available media that is accessible by computer system/server 1002, and it includes both volatile and non-volatile media, removable and non-removable media.

System memory 1806, in one embodiment, comprises the interactive environment 110 (e.g., the connector/pattern design and creation environment) and its components as shown in FIG. 1. These one or more components of the interactive environment 110 can also be implemented in hardware as well. The system memory 1806 can include computer system readable media in the form of volatile memory, such as random access memory (RAM) 1810 and/or cache memory 1812. Computer system/server 1802 may further include other removable/non-removable, volatile/non-volatile computer system storage media. By way of example only, storage system 1814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1808 by one or more data media interfaces. As will be further depicted and described below, memory 1806 may include at least one program product having a set (e.g., at least one) of program modules that are configured to carry out the functions of various embodiments of the invention.

Program/utility 1816, having a set (at least one) of program modules 1818, may be stored in memory 1806 by way of example, and not limitation, as well as an operating system, one or more application programs, other program modules, and program data. Each of the operating system, one or more application programs, other program modules, and program data or some combination thereof, may include an implementation of a networking environment. Program modules 1818 generally carry out the functions and/or methodologies of various embodiments of the invention as described herein.

Computer system/server 1802 may also communicate with one or more external devices 1020 such as a keyboard, a pointing device, a display 1822, etc.; one or more devices that enable a user to interact with computer system/server 1802; and/or any devices (e.g., network card, modem, etc.) that enable computer system/server 1802 to communicate with one or more other computing devices. Such communication can occur via I/O interfaces 1824. Still yet, computer system/server 1002 can communicate with one or more networks such as a local area network (LAN), a general wide area network (WAN), and/or a public network (e.g., the Internet) via network adapter 1826. As depicted, network adapter 1826 communicates with the other components of computer system/server 1802 via bus 1808. It should be understood that although not shown, other hardware and/or software components could be used in conjunction with computer system/server 1802. Examples, include, but are not limited to: microcode, device drivers, redundant processing units, external disk drive arrays, RAID systems, tape drives, and data archival storage systems, etc.

Figure 19:
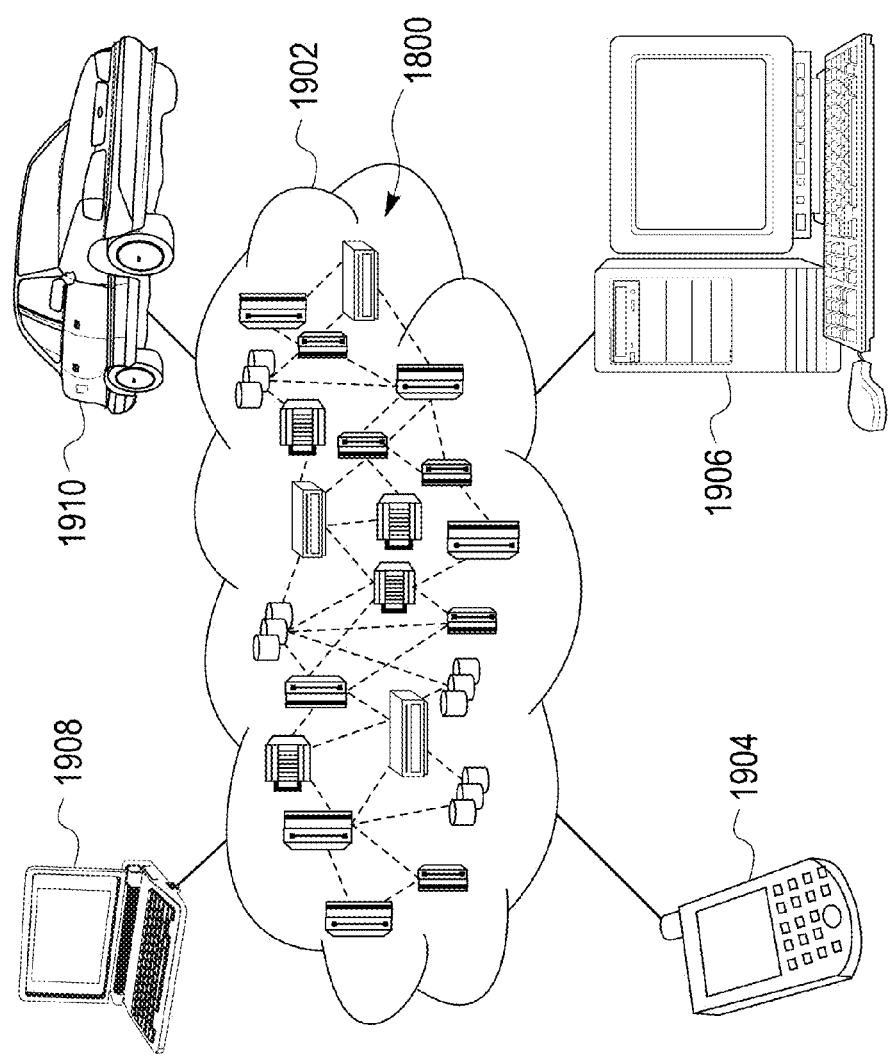
FIG. 19 illustrates one example of a cloud computing environment according to one example of the present invention.

Referring now to FIG. 19, illustrative cloud computing environment 1902 is depicted. As shown, cloud computing environment 1902 comprises one or more cloud computing nodes 1000 with which local computing devices used by cloud consumers, such as, for example, personal digital assistant (PDA) or cellular telephone 1904, desktop computer 1906, laptop computer 1908, and/or automobile computer system 1910 may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 1902 to offer infrastructure, platforms and/or software as services for which a cloud consumer does not need to maintain resources on a local computing device. It is understood that the types of computing devices 1904, 1906, 1908, 1910 shown in FIG. 19 are intended to be illustrative only and that computing nodes 1800 and cloud computing environment 1902 can communicate with any type of computerized device over any type of network and/or network addressable connection (e.g., using a web browser).

Figure 20:
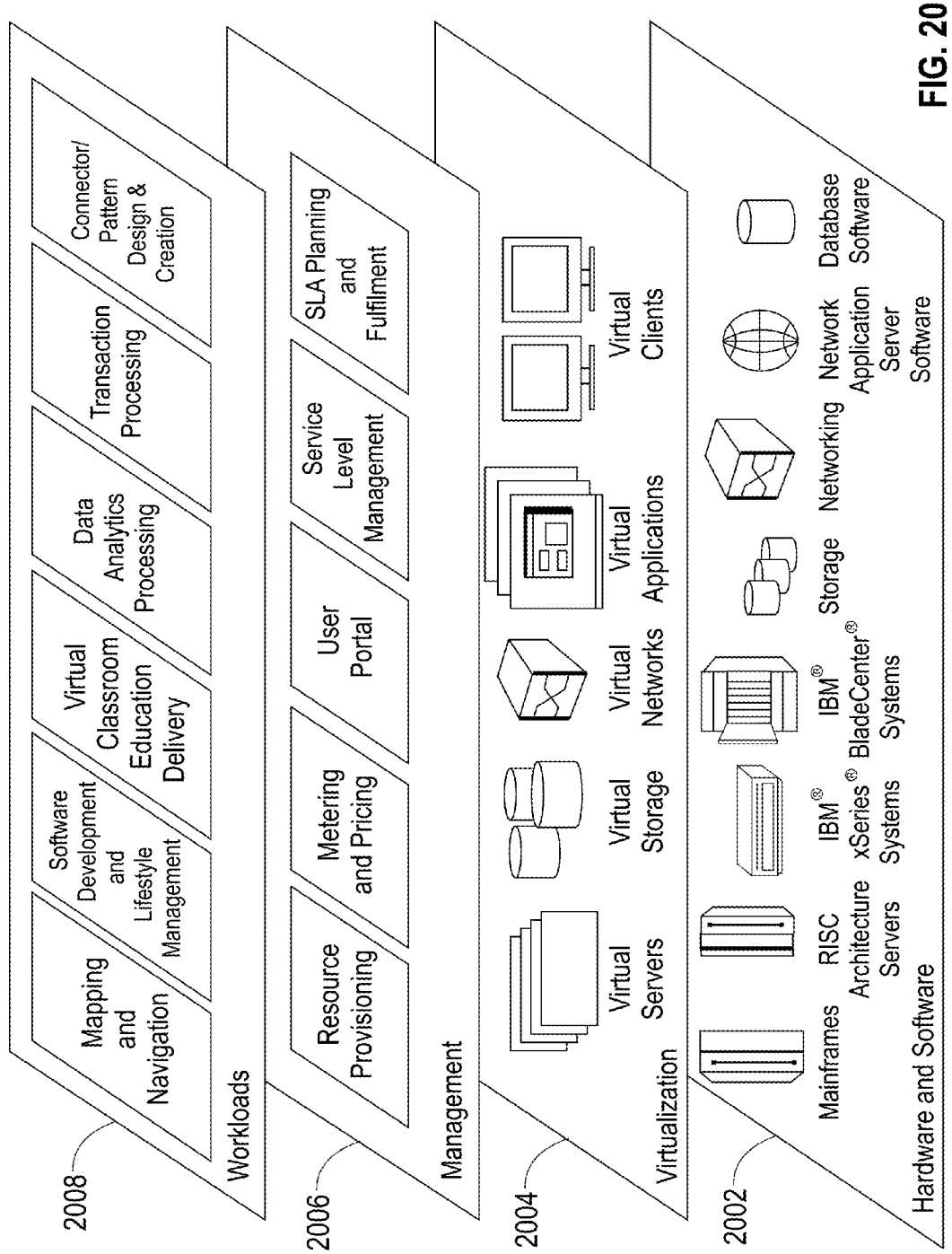
FIG. 20 illustrates abstraction model layers according to one example of the present invention.

Referring now to FIG. 20, a set of functional abstraction layers provided by cloud computing environment 1902 (FIG. 19) is shown. It should be understood in advance that the components, layers, and functions shown in FIG. 20 are intended to be illustrative only and embodiments of the invention are not limited thereto. As depicted, the following layers and corresponding functions are provided:

Hardware and software layer 2002 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 2004 provides an abstraction layer from which the following examples of virtual entities may be provided: virtual servers; virtual storage; virtual networks, including virtual private networks; virtual applications and operating systems; and virtual clients.

In one example, management layer 2006 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 2008 provides examples of functionality for which the cloud computing environment may be utilized. Examples of workloads and functions which may be provided from this layer include: mapping and navigation; software development and lifecycle management; virtual classroom education delivery; data analytics processing; transaction processing; and composable software bundle and virtual image asset design and creation.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for creating a cross-configuration software module for cross-configuring software entities, the system comprising: a memory; a hardware processor communicatively coupled to the memory; and a connector creation tool communicatively coupled to the memory and the processor, wherein the connector creation tool is configured to perform a method comprising:
retrieving a semantic representation of a set of systems utilizing the cross-configuration software module, wherein the cross-configuration software module is a self-contained software package configured to automatically cross-configure software entities to interact with each other, the semantic representation semantically representing a set of requirements that identifies at least one set of software entities required to be present on the set of systems, the set of software entities comprising at least one composable software bundle that includes a cloud independent description of software capturing a set of aspects needed to install and configure the software in a virtual machine;
retrieving a functional representation of a set of operations, each operation in the set of operations is performed on the set of software entities associated with the set of systems during at least one connector life-cycle phase in a set of connector life-cycle phases, wherein the set of operations cross-configures at least a first of the set of software entities with at least a second of the set of software entities;
identifying a set of artifacts comprising at least one of a set of metadata and a set of executable instructions associated with the set of operations; and
storing the semantic representation, the functional representation, and the set of artifacts, in the cross-configuration software module.

2. The system of claim 1, wherein the semantic representation semantically represents a set of capabilities associated with the set of systems, wherein the set of capabilities identify one or more software entities to be installed by the cross-configuration software module on at least one of the set of systems.

3. The system claim 1, wherein the set of executable instructions comprises at least one of:
a configuration script; and
an installation script.

4. The system of claim 1, wherein the set of systems comprises at least one of:
a virtual image;
a virtual appliance; and
a physical system.

5. The system of claim 1, wherein the set of connector life-cycle phases comprises at least one of:
- a connector install life-cycle phase; and
- a connector configuration life-cycle phase.

6. The system of claim 1, wherein the set of executable instructions is a script that installs one or more software entities on at least one of the set of systems during one of the set of connector life-cycle phases associated with the script.

7. The system of claim 1, wherein the set of executable instructions is a script that configures one or more software entities installed on at least one of the set of systems during one of the set of connector life-cycle phases associated with the script.

8. A system for creating a cross-configuration software module for cross-configuring software entities, the system comprising:
- a memory;
- a hardware processor communicatively coupled to the memory; and a connector creation tool communicatively coupled to the memory and the processor, wherein the connector creation tool is configured to perform a method comprising:
- receiving a selection of at least one system comprising a set of software entities;
- identifying a plurality of cross-configuration software modules, wherein each cross-configuration software module is a self-contained software package configured to automatically cross-configure software entities to interact with each other, each cross-configuration software module comprises at least two configuration definitions each comprising at least a set of requirements and identifying at least one software module to be cross-configured, and the set of requirements identifies at least one set of software entities required to be present on at least one system comprising software entities to be cross-configured, the identified set of software entities comprising at least one composable software bundle that includes a cloud independent description of software capturing a set of aspects needed to install and configure the software in a virtual machine;
- comparing the set of software entities of the at least one system to the set of requirements for each of the plurality of cross-configuration software modules;
- identifying, based on the comparing, at least one of the plurality of cross-configuration software modules having the set of requirements being satisfied by at least two of the set of software entities of the at least one system; and
- automatically cross-configuring the at least two of the set of software entities based on the at least two configuration definitions of the at least one identified cross-configuration software module, wherein the automatically cross-configuring automatically configures each of the at least two of the set of software entities to interact with each other.

9. The system of claim 8, wherein the method further comprises:
- displaying, via a user interface and prior to the automatic cross-configuration, the at least one identified cross-configuration software module to a user; and
- receiving, based on the displaying, a selection from the user of the at least one identified cross-configuration software module, wherein the automatically cross-configuring is performed based on receiving the selection from the user.

10. The system of claim 8, wherein the automatic cross-configuration comprises: executing at least one operation defined by the at least one of the two configuration definitions on at least one of the at least two of the set of software entities.

11. The system of claim 10, wherein the automatic cross-configuration further comprises:
- installing a set of artifacts included in at least one of the two configuration definitions on one of the at least two systems, wherein the set of artifacts are required by the at least one operation.

12. The system of claim 11, wherein the set of artifacts are installed prior to the at least one system comprising the at least one of the at least two of the set of software entities being captured, and wherein the at least one operation is executed upon deployment of the at least one system.

13. The system of claim 12, wherein the set of artifacts are installed upon deployment of the at least one system, and wherein the at least one operation is executed upon deployment of the at least one system.

* * * * *